US012795690B2

(12) United States Patent
Kim et al.

(10) Patent No.: US 12,795,690 B2
(45) Date of Patent: Nov. 10, 2026

(54) METHOD AND DEVICE FOR TRANSMITTING/RECEIVING CONTROL INFORMATION IN WIRELESS COMMUNICATION SYSTEM

(71) Applicant: LG ELECTRONICS INC., Seoul (KR)

(72) Inventors: Seonwook Kim, Seoul (KR); Suckchel Yang, Seoul (KR); Seunghwan Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 331 days.

(21) Appl. No.: 18/681,330

(22) PCT Filed: Aug. 1, 2022

(86) PCT No.: PCT/KR2022/011283

§ 371 (c)(1),
(2) Date: Feb. 5, 2024

(87) PCT Pub. No.: WO2023/014010

PCT Pub. Date: Feb. 9, 2023

(65) Prior Publication Data

US 2024/0365337 A1 Oct. 31, 2024

(30) Foreign Application Priority Data

Aug. 5, 2021 (KR) ........................ 10-2021-0103169
Aug. 13, 2021 (KR) ........................ 10-2021-0107519
(Continued)

(51) Int. Cl.
*H04W 72/232* (2023.01)
*H04L 5/00* (2006.01)
(Continued)

(52) U.S. Cl.
CPC ......... *H04W 72/232* (2023.01); *H04L 5/0055* (2013.01); *H04W 72/0446* (2013.01); *H04W 72/11* (2023.01)

(58) Field of Classification Search
CPC ......... H04W 72/1268; H04W 72/0446; H04W 72/0453; H04W 72/231; H04W 72/23;
(Continued)

(56) References Cited

U.S. PATENT DOCUMENTS

2022/0038218 A1* 2/2022 Kim ...................... H04L 1/1819
2022/0240289 A1* 7/2022 Karaki .................. H04L 1/1896

FOREIGN PATENT DOCUMENTS

KR 10-2021-0061259 A 5/2021
WO WO 2020/204800 10/2020
WO WO 2021/028414 2/2021

OTHER PUBLICATIONS

CMCC, "Discussion on UCI enhancements for URLLC," R1-1912539, 3GPP TSG RAN WG1 #99, Reno, USA, Nov. 18-22, 2019, 9 pages.
Extended European Search Report in European Appln. No. 22853388.1, mailed on Jul. 16, 2025, 7 pages.
Ericsson, "Mechanisms to support MBS group scheduling for RRC_Connected UEs, " 3GPP TSG-RAN WG1 Meeting #104-e, R1-2101726, e-Meeting, Jan. 25-Feb. 5, 2021, 16 pages.
(Continued)

*Primary Examiner* — Ayanah S George
(74) *Attorney, Agent, or Firm* — Fish & Richardson P.C.

(57) ABSTRACT

A method and a device for transmitting/receiving control information in a wireless communication system are disclosed. The method for transmitting/receiving control information according to an embodiment of the present disclosure may comprise the steps of: receiving configuration information for a semi-persistent scheduling (SPS) physical downlink shared channel (PDSCH) from a base station; receiving downlink control information (DCI) for activation of the SPS PDSCH from the base station; and receiving at least one PDSCH from the base station on the basis of the DCI.

9 Claims, 16 Drawing Sheets

(30) Foreign Application Priority Data

| | | |
|---|---|---|
| Oct. 8, 2021 | (KR) | ........................ 10-2021-0133949 |
| Nov. 4, 2021 | (KR) | ........................ 10-2021-0150658 |
| Apr. 19, 2022 | (KR) | ........................ 10-2022-0048404 |

(51) Int. Cl.
*H04W 72/0446* (2023.01)
*H04W 72/11* (2023.01)

(58) Field of Classification Search
CPC ....... H04L 5/0012; H04L 1/08; H04L 5/0023; H04L 5/0053; H04L 5/0094; H04L 5/00; H04B 1/713; H04B 7/024; H04B 7/0408; H04B 7/0695
See application file for complete search history.

(56) References Cited

OTHER PUBLICATIONS

Ericsson, "PDSCH/PUSCH enhancements," 3GPP TSG-RAN WG1 Meeting #105-e, Tdoc R1-2104462, e-Meeting, May 10-27, 2021, 26 pages.

International Search Report and Written Opinion in Appln. No. PCT/KR2022/011283, mailed on Nov. 16, 2022, 8 pages (with English translation).

Moderator (LG Electronics), "Summary #2 of PDSCH/PUSCH enhancements (Scheduling/HARQ)," 3GPP TSG RAN WG1 #105-e, R1-2106105, e-Meeting, May 10-27, 2021, 140 pages.

Office Action in Korean Appln. No. 10-2024-7002165, mailed on Mar. 18, 2026, 11 pages (with English translation).

* cited by examiner

METHOD AND DEVICE FOR TRANSMITTING/RECEIVING CONTROL INFORMATION IN WIRELESS COMMUNICATION SYSTEM

CROSS-REFERENCE TO RELATED APPLICATIONS

This application is a National Stage application under 35 U.S.C. § 371 of International Application No. PCT/KR2022/011283, filed on Aug. 1, 2022, which claims the benefit of earlier filing date and right of priority to Korean Application No. 10-2021-0103169, filed on Aug. 5, 2021, Korean Application No. 10-2021-0107519, filed on Aug. 13, 2021, Korean Application No. 10-2021-0133949, filed on Oct. 8, 2021, Korean Application No. 10-2021- 0150658, filed on Nov. 4, 2021, and Korean Application No. 10-2022-0048404, filed on Apr. 19, 2022, the contents of which are all hereby incorporated by reference herein in their entirety.

TECHNICAL FIELD

The present disclosure relates to a wireless communication system, and in more detail, relates to a method and an apparatus of transmitting and receiving uplink control information in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus of scheduling one or more downlink transmissions and/or one or more uplink transmissions through single downlink control information.

An additional technical object of the present disclosure is to provide a method and an apparatus of transmitting and receiving Hybrid Automatic Repeat and request (HARQ)-acknowledgement (ACK) information for one or more downlink transmissions scheduled through single downlink control information.

The technical objects to be achieved by the present disclosure are not limited to the above-described technical objects, and other technical objects which are not described herein will be clearly understood by those skilled in the pertinent art from the following description.

A method of transmitting and receiving control information in a wireless communication system according to an aspect of the present disclosure may comprise: receiving, from a base station, configuration information for a semi-persistent scheduling (SPS) physical downlink shared channel (PDSCH); receiving, from the base station, downlink control information (DCI) for activation of the SPS PDSCH; and receiving, from the base station, at least one PDSCH based on the DCI. Herein, a row index indicated by a time domain resource assignment (TDRA) field of the DCI may be associated with a single start and length indicator value (SLIV).

A method of transmitting and receiving control information in a wireless communication system according to an additional aspect of the present disclosure may comprise: transmitting, to a user equipment, configuration information for a semi-persistent scheduling (SPS) physical downlink shared channel (PDSCH); transmitting, to the UE, downlink control information (DCI) for activation of the SPS PDSCH; and transmitting, to the UE, at least one PDSCH based on the DCI. Herein, a row index indicated by a time domain resource assignment (TDRA) field of the DCI may be associated with a single start and length indicator value (SLIV).

According to an embodiment of the present disclosure, a method and an apparatus of scheduling one or more downlink transmissions and/or one or more uplink transmissions through single downlink control information may be provided.

In addition, according to an embodiment of the present disclosure, a method and an apparatus of transmitting and receiving Hybrid Automatic Repeat and request (HARQ)-acknowledgement (ACK) information for one or more downlink transmissions scheduled through single downlink control information may be provided.

In addition, according to an embodiment of the present disclosure, even when DCI for activation/deactivation of SPS PDSCH schedules a plurality of PDSCHs, ambiguity of SPS PDSCH resources can be removed, and there is an advantage in that terminal implementation complexity is lowered.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
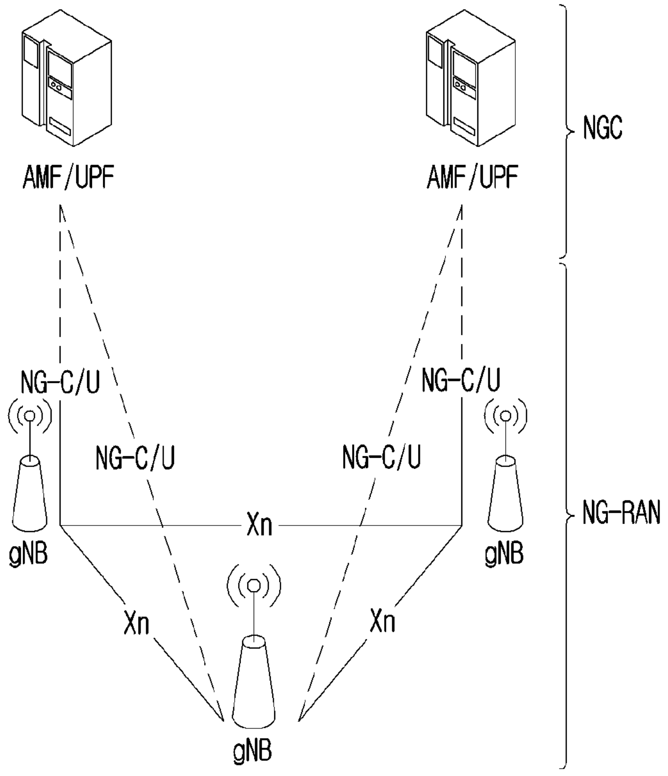
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000.

TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
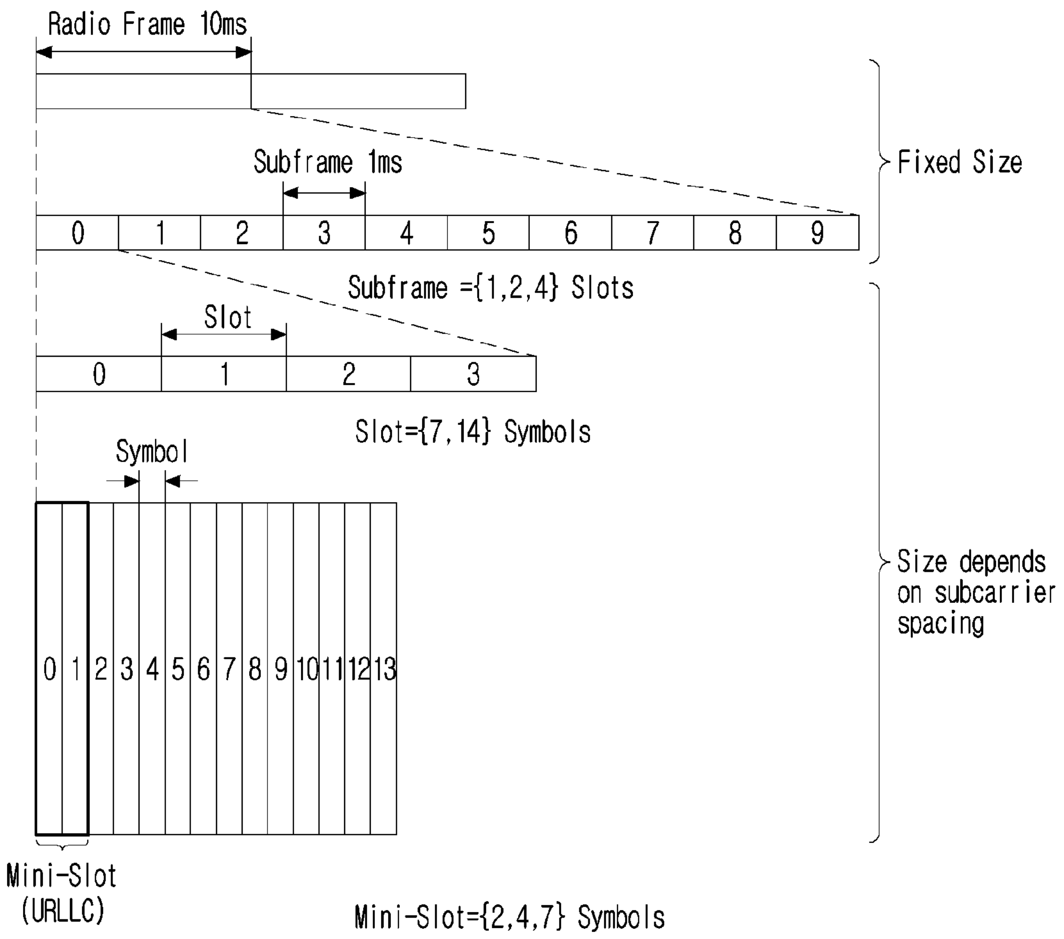
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, $\mu$). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^{\mu} \cdot 15$ [KHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHZ | 60, 120, 240 KHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480.103 Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration $\mu$, slots are numbered in an increasing order of $n_s^{\mu} \in \{0, \ldots, N_{slot}^{subframe,\mu}-1\}$ in a subframe and are numbered in an increasing order of $n_{s,f}^{\mu} \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu} N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on $\mu=2$ (SCS is 60 kHz), 1 subframe may include 4 slots referring to Table 3. 1 subframe=\{1,2,4\} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
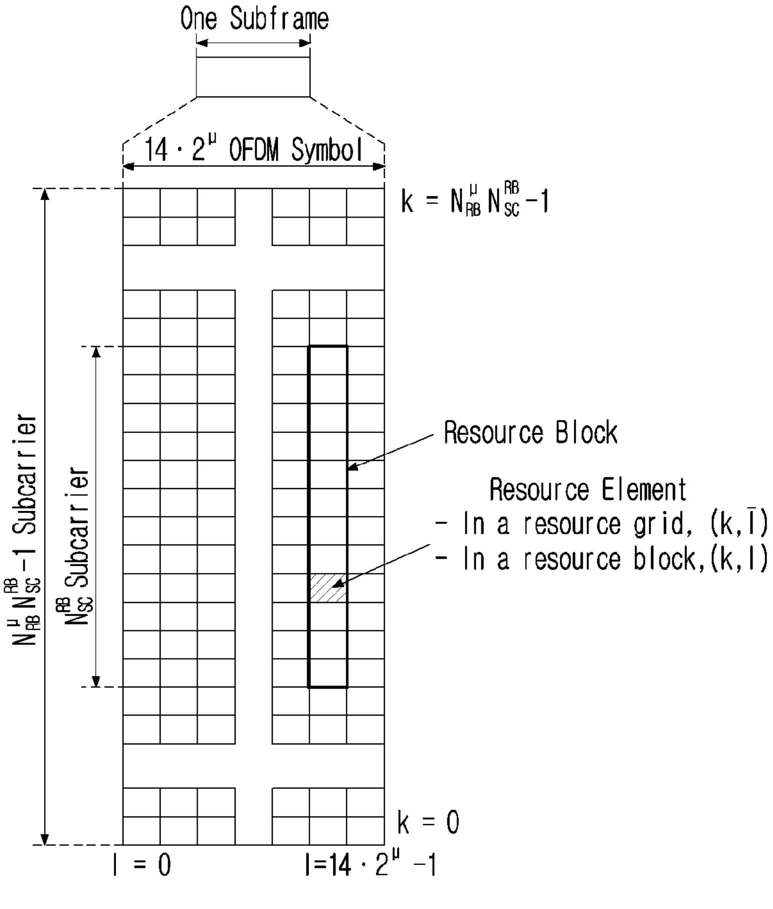
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu} N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} < N_{RB}^{max,\mu}$. The $N_{RB}^{max,\mu}$ represents a maximum transmission bandwidth, which may be different between an uplink and a downlink as well as between numerologies. In this case, one resource grid may be configured per u and antenna port p. Each element of a resource grid for u and an antenna port p is referred to as a resource element and is uniquely identified by an index pair (k,l'). Here, $k=0, \ldots, N_{RB}^{\mu} N_{sc}^{RB}-1$ is an index in a frequency domain and $l'=0 \ldots, 2^{\mu} N_{symb}^{(\mu)}-1$ refers to a position of a symbol in a subframe. When referring to a resource element in a slot, an index pair (k,l) is used. Here, $l=0, \ldots, N_{symb}^{\mu}-1$. A resource element (k,l') for μ and an antenna port p corresponds to a complex value, $a_{k,l'}^{(p,\mu)}$. When there is no risk of confusion or when a specific antenna port or numerology is not specified, indexes p and u may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{PRB}$ and a resource element (k,l) for a subcarrier spacing configuration μ in a frequency domain is given as in the following Equation 1.

$$n_{CRB}^{\mu} = \left\lfloor \frac{k}{N_{SC}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
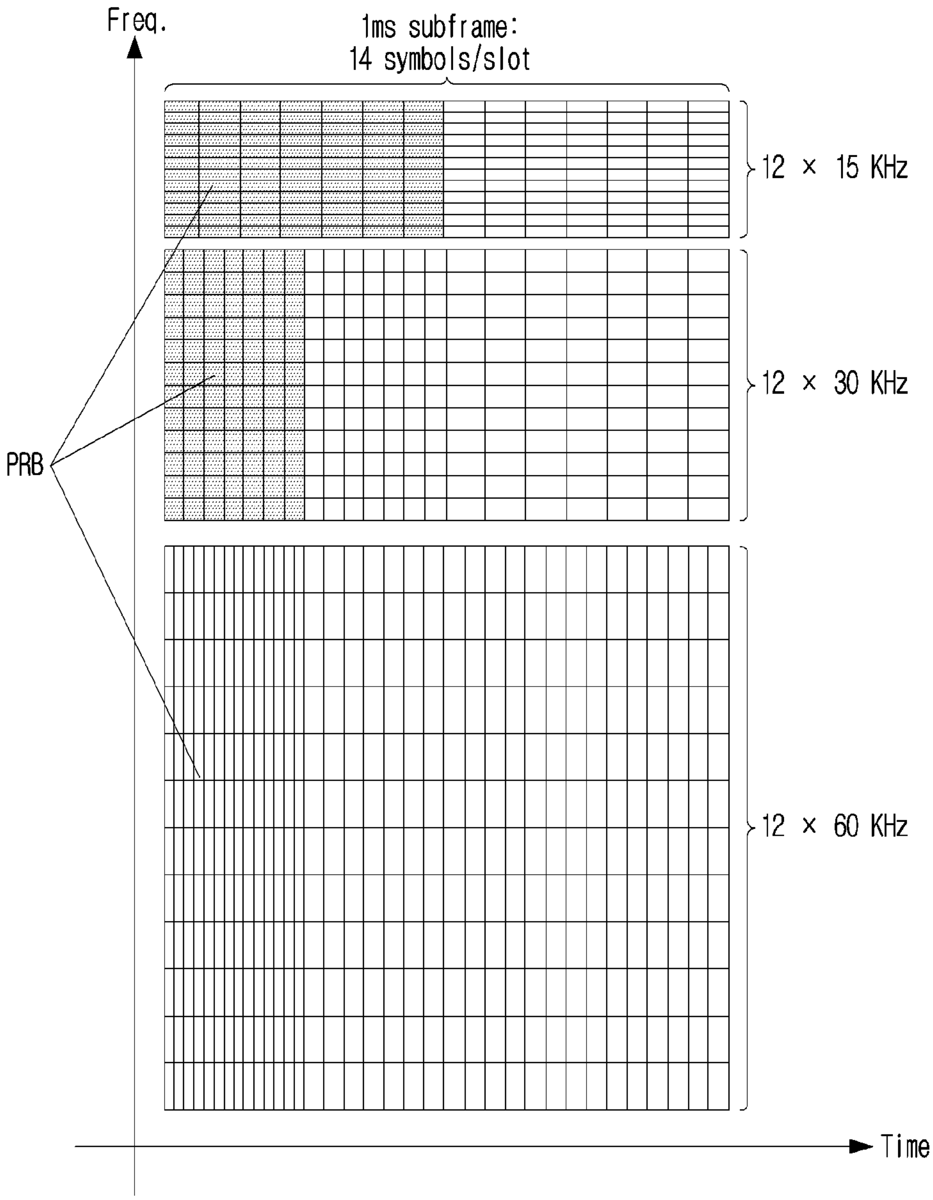
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
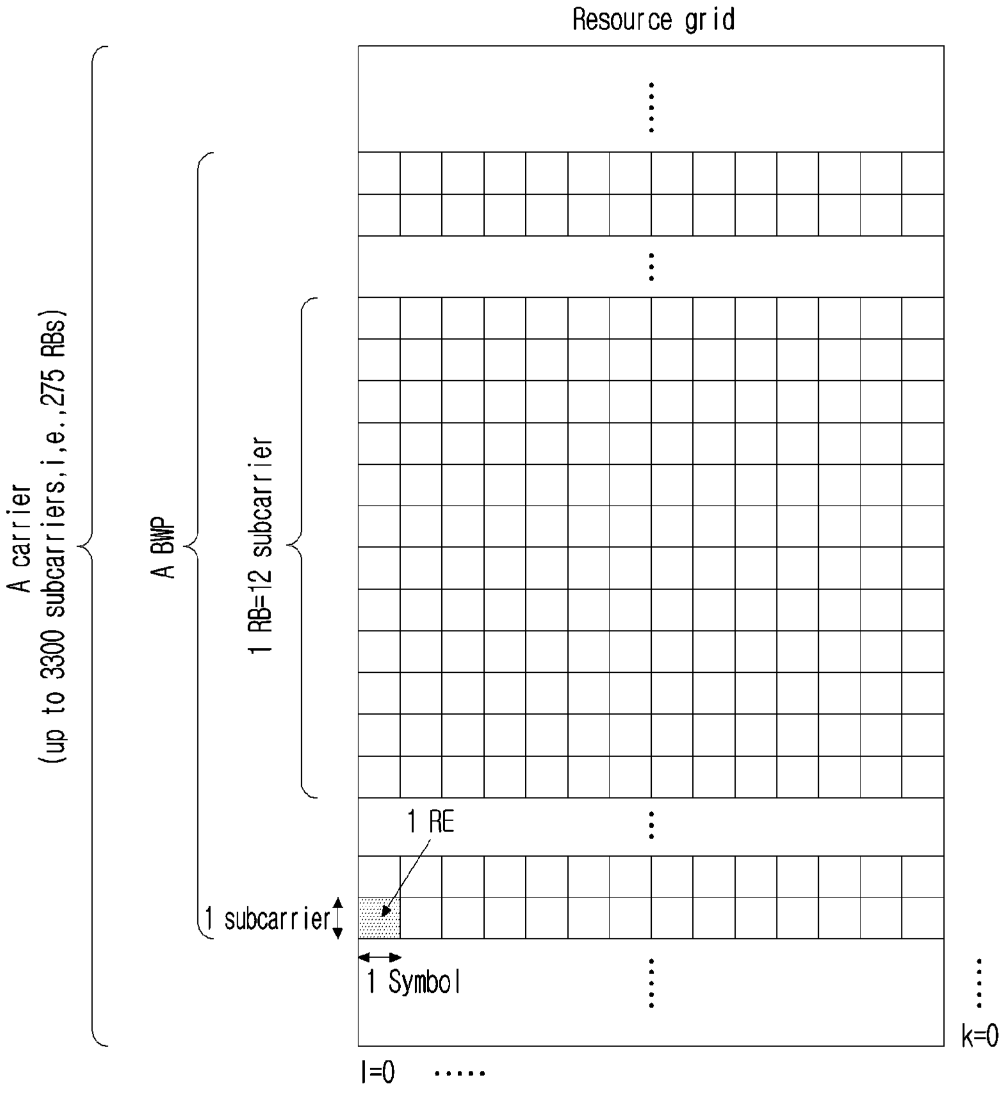
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
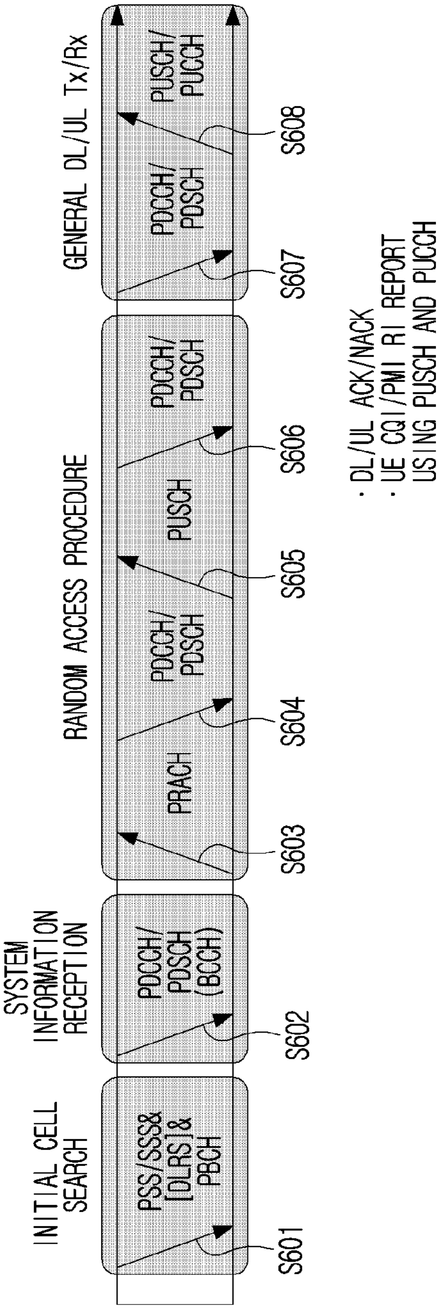
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH)

from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Figure 7:
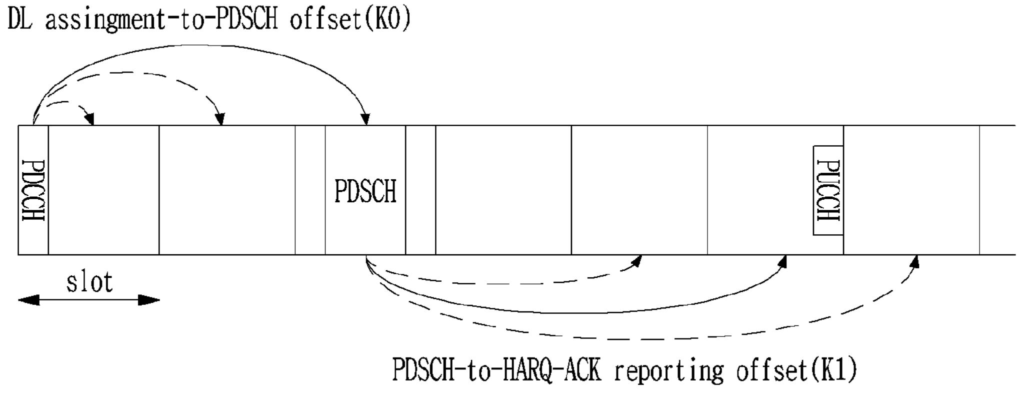
FIG. 7 illustrates a HARQ-ACK process for downlink data in a wireless communication system to which the present disclosure may be applied.

Data Transmission and HARQ (Hybrid Automatic Repeat and reQuest)-ACK (Acknowledgment) Process FIG. 7 illustrates a HARQ-ACK process for downlink data in a wireless communication system to which the present disclosure may be applied.

Referring to FIG. 7, a UE may detect a PDCCH in slot #n. Here, a PDCCH includes downlink scheduling information (e.g., DCI formats 1_0 and 1_1), and the PDCCH indicates a DL assignment-to-PDSCH offset (K0) and a PDSCH-HARQ-ACK reporting offset (K1). For example, DCI formats 1_0 and 1_1 may include the following information.

- Frequency domain resource assignment: indicates a RB resource (e.g., one or more (dis-) continuous RBs) allocated to a PDSCH.
- Time domain resource assignment: K0, indicates a starting position (e.g., OFDM symbol index) and a length (e.g., number of OFDM symbols) of a PDSCH in a slot
- PDSCH-to-HARQ_feedback timing indicator: indicates K1.
- HARQ process number (4 bits): indicates a HARQ process ID (Identity) for data (e.g., PDSCH, TB).

PUCCH resource indicator (PRI: PUCCH resource indicator): indicates a PUCCH resource to be used for UCI transmission among a plurality of PUCCH resources in a PUCCH resource set.

Thereafter, a UE may receive a PDSCH in a slot #(n+K0) according to scheduling information of slot #n, and then transmit UCI through PUCCH in a slot #(n+K1). Here, UCI includes a HARQ-ACK response for a PDSCH. If a PDSCH is configured to transmit up to 1 TB, a HARQ-ACK response may be configured with 1-bit. When a PDSCH is configured to transmit up to 2 TBs, a HARQ-ACK response may be configured with 2-bits when spatial bundling is not configured, and may be configured with 1-bits when spatial bundling is configured. When the HARQ-ACK transmission time for a plurality of PDSCHs is designated as a slot #(n+K1), UCI transmitted in a slot #(n+K1) includes HARQ-ACK responses for the plurality of PDSCHs.

CBG (Code Block Group)-Based HARQ Process

In LTE, a Transport Block (TB)-based HARQ process is supported. In NR, a CBG-based HARQ process is supported along with the TB-based HARQ process.

Figure 8:
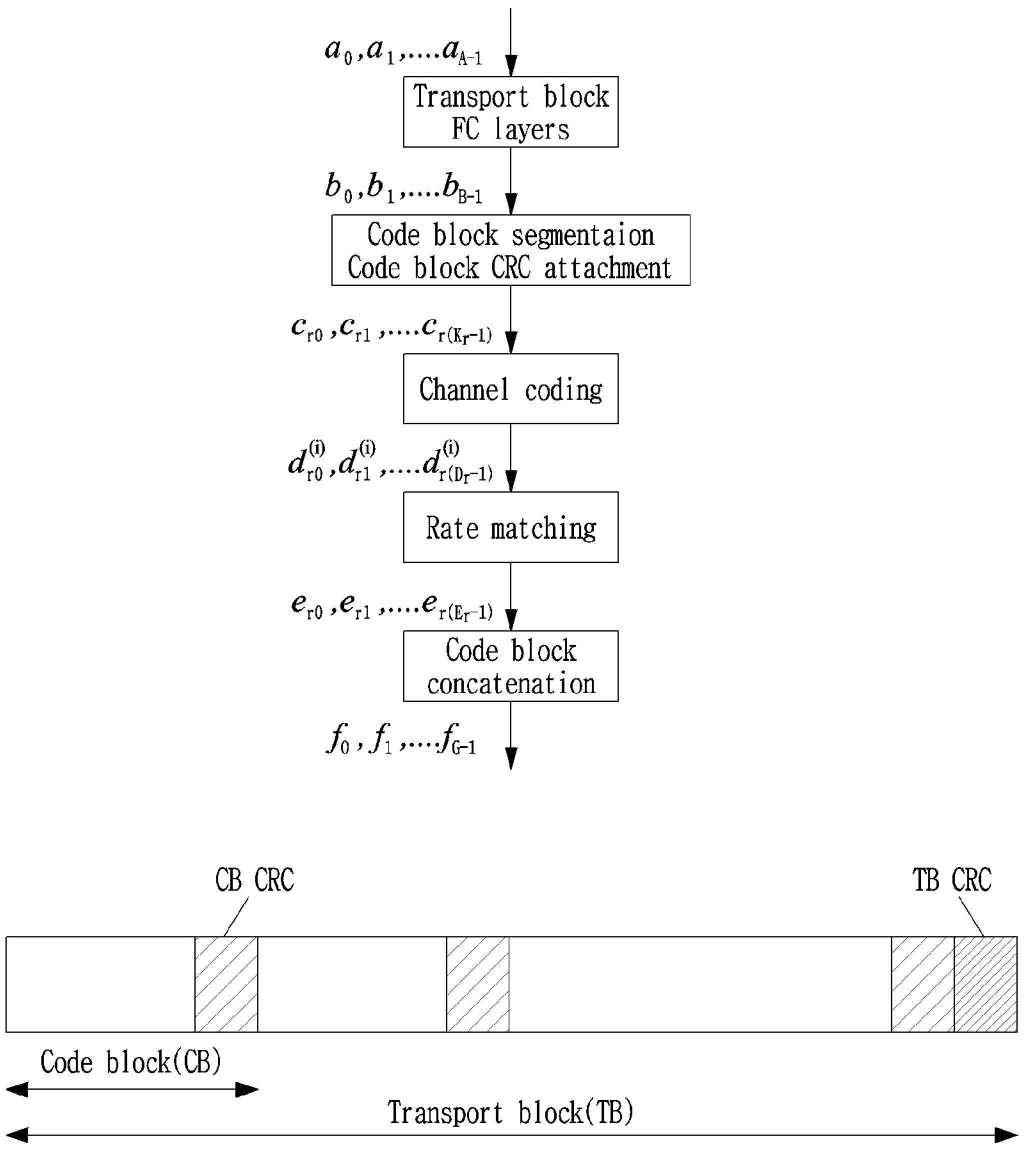
FIG. 8 illustrates a processing process and structure of a TB in a wireless communication system to which the present disclosure may be applied.

FIG. 8 illustrates a processing process and structure of a TB in a wireless communication system to which the present disclosure may be applied.

The procedure of FIG. 8 may be applied to data of a DL-Shared Channel (DL-SCH), a Paging Channel (PCH) and a Multicast Channel (MCH) transport channel. UL TB (or data of UL transport channel) may be similarly processed.

Referring to FIG. 8, a transmitter attaches a CRC (e.g., 24-bits) (TB CRC) to a TB for error checking. Thereafter, a transmitter may divide TB+CRC into a plurality of code blocks in consideration of a size of a channel encoder. As an example, the maximum size of a codeblock (CB) in LTE is 6144-bit. Accordingly, if a TB size is smaller than 6144-bit, a CB is not configured, and if a TB size is larger than 6144-bit, a TB is divided into 6144-bit size units to generate a plurality of CBs. A CRC (e.g., 24-bits) (CB CRC) is individually attached to each CB for error checking. After each CB is channel-coded and rate-matched, a codeword (CW) is generated by combining them into one. Data scheduling and a HARQ process according thereto are performed in units of TB, and CB CRC is used to determine early termination of TB decoding.

Figure 9:
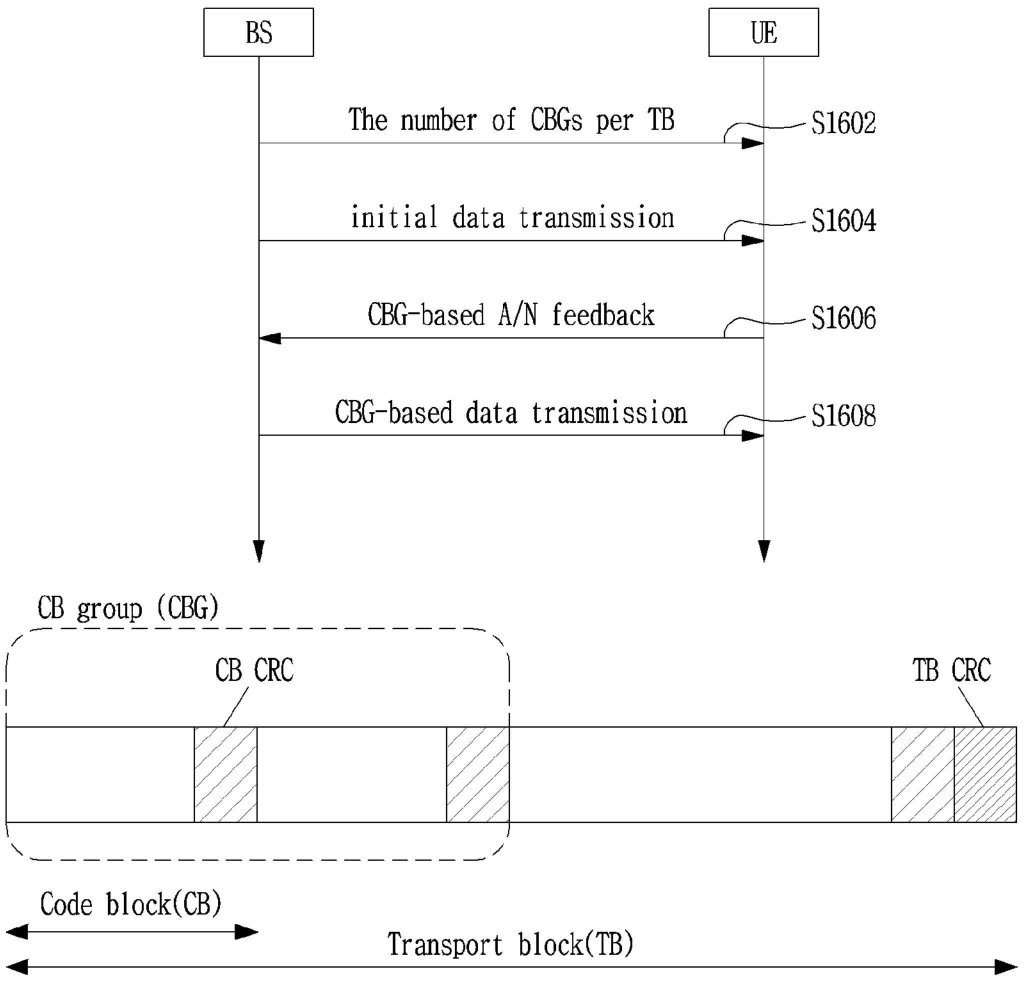
FIG. 9 illustrates a CBG-based HARQ process in a wireless communication system to which the present disclosure may be applied.

FIG. 9 illustrates a CBG-based HARQ process in a wireless communication system to which the present disclosure may be applied.

In a CBG-based HARQ process, data scheduling and a corresponding HARQ process may be performed in units of CBG.

Referring to FIG. 9, a UE may receive information on the maximum number M of codeblock groups (CBG) per transport block from a base station through a higher layer signal (e.g., RRC signal) (S1602). Thereafter, a UE may receive an initial data transmission (through PDSCH) from a base station (S1604). Here, data includes a TB, a transport block includes a plurality of CBs, and a plurality of CBs may be classified into one or more CBGs. Here, some of CBGs may include ceiling (K/M) number of CBs, and the remaining CBGs may include flooring (K/M) number of CBs. K represents the number of CBs in data. Thereafter, a UE may feed back CBG-based A/N information for data to a base station (S1606), and a base station may perform data retransmission based on a CBG (S1608). A/N information may be transmitted through PUCCH or PUSCH. Here, A/N information may include a plurality of A/N bits for data, and each A/N bit may indicate each A/N response generated in units of CBG for data. A payload size of A/N information may be maintained the same based on M regardless of CBG included in data.

Dynamic/Semi-Static HARQ-ACK Codebook Scheme

NR supports a dynamic HARQ-ACK codebook scheme and a semi-static HARQ-ACK codebook scheme. A HARQ-ACK (or A/N) codebook may be substituted with a HARQ-ACK payload.

When a dynamic HARQ-ACK codebook scheme is configured, a size of an A/N payload varies according to the actual number of scheduled DL data. To this end, a PDCCH related to DL scheduling includes a counter-downlink assignment index (counter-DAI) and a total-DAI. A counter-DAI indicates a {CC, slot} scheduling order value calculated in a CC (Component Carrier) (or cell)-first method, and is used to designate a position of an A/N bit in an A/N codebook. A total-DAI indicates a slot-unit scheduling accumulative value up to a current slot, and is used to determine a size of an A/N codebook.

When a semi-static A/N codebook scheme is configured, a size of an A/N codebook is fixed (to a maximum value) regardless of the actual number of scheduled DL data. Specifically, an (maximum) A/N payload (size) transmitted through one PUCCH in one slot may be determined by the number of corresponding A/N bits corresponding to a combination of all CCs configured for a UE and all DL scheduling slots (or PDSCH transmission slots or PDCCH monitoring slots) to which the A/N transmission timing can be indicated (hereinafter, bundling window). For example, DL grant DCI (PDCCH) includes PDSCH-to-A/N timing information, and the PDSCH-to-A/N timing information may have one (e.g., k) of a plurality of values. For example, when a PDSCH is received in slot #m, and PDSCH-to-A/N timing information in the DL grant DCI (PDCCH) scheduling the PDSCH indicates k, the A/N information for the PDSCH may be transmitted in slot #(m+k). As an example, $k \in \{1, 2, 3, 4, 5, 6, 7, 8\}$ may be given. Meanwhile, when A/N information is transmitted in slot #n, the A/N information may include a maximum possible A/N based on a bundling window. That is, A/N information of slot #n may include an A/N corresponding to slot #(n-k). For example, if $k \in \{1, 2, 3, 4, 5, 6, 7, 8\}$, A/N information of slot #n includes A/Ns (i.e., the maximum number of A/Ns) corresponding to from slot #(n-8) to slot #(n-1) regardless of actual DL data reception. Here, A/N information may be substituted with an A/N codebook and an A/N payload. In addition, a slot may be understood as/substituted with a candidate occasion for DL data reception. As an example, a bundling window may be determined based on PDSCH-to-A/N timing based on an A/N slot, and a PDSCH-to-A/N timing set may has a pre-defined value (e.g., {1, 2, 3, 4, 5, 6, 7, 8}) or may be configured by higher layer (RRC) signaling.

A dynamic/semi-static HARQ-ACK codebook configuration defined in the NR standard is as follows. When a UE is configured with a PDSCH HARQ-ACK codebook (pdsch-HARQ-ACK-Codebook) parameter set to semi-static, the UE determines a Type-1 HARQ-ACK codebook report (i.e., a semi-static HARQ-ACK codebook). On the other hand, when a UE is configured with a PDSCH HARQ-ACK codebook (pdsch-HARQ-ACK-Codebook) (or pdsch-HARQ-ACK-Codebook-r16) parameter set to dynamic, the UE determines a Type-2 HARQ-ACK codebook report (i.e., a dynamic HARQ-ACK codebook).

HARQ-ACK Codebook Configuration Method for Multiple PDSCH Scheduling

PUSCH: Physical Uplink Shared Channel

RRM: Radio resource management

SCS: Sub-carrier spacing

RLM: Radio link monitoring

DCI: Downlink Control Information

CAP: Channel Access Procedure

Ucell: Unlicensed cell

TBS: Transport Block Size

TDRA: Time Domain Resource Allocation

SLIV: Start and Length Indicator Value. (It is an indication value for a start symbol index and the number of symbols in a slot of a PDSCH and/or PUSCH. It may be configured as a component of an entry in a TDRA field in a PDCCH for scheduling a corresponding PDSCH and/or PUSCH.)

BWP: Bandwidth Part (BandWidth Part) (It may be configured with continuous resource blocks (RB) on a frequency axis. One numerology (e.g., SCS, CP length, slot/mini-slot duration, etc.). In addition, a plurality of BWPs may be configured in one carrier (the number of BWPs per carrier may also be limited), however the number of activated BWPs may be limited to a part (e.g., one) per carrier.)

CORESET: Control resource set (It means a time frequency resource region in which a PDCCH can be transmitted, the number of CORESETs per BWP may be limited.)

REG: Resource element group

SFI: Slot Format Indicator (It is an indicator indicating a symbol level DL/UL direction in a specific slot(s), it is transmitted through a group common PDCCH.)

COT: Channel occupancy time

SPS: Semi-persistent scheduling

QCL: Quasi-Co-Location (A QCL relationship between two reference signals (RS) may mean that QCL parameters such as Doppler shift, Doppler spread, average delay, average spread, and spatial reception parameter, etc. obtained from one RS can be applied to other RSs (or antenna port(s) of a corresponding RS). In the NR system, 4 QCL types are defined as follows. 'typeA': {Doppler shift, Doppler spread, average delay, delay spread}, 'typeB': {Doppler shift, Doppler spread}, 'typeC': {Doppler shift, average delay}, 'typeD': {Spatial Rx parameter}. For a certain DL RS antenna port(s), a first DL RS is configured as a reference for QCL type X (X=A, B, C, or D), and in addition, a second DL RS may be configured as a reference for QCL type Y (Y=A, B, C, or D, but X≠Y).)

TCI: Transmission Configuration Indication (One TCI state includes a QCL relationship between one or a plurality of DL RSs and DM-RS ports of a PDSCH, DM-RS ports of a PDCCH, or CSI-RS port(s) of a CSI-RS resource. For 'Transmission Configuration Indication' among fields in DCI for scheduling a PDSCH, a TCI state index corresponding to each code point in the field is activated by a MAC control element (CE), and a TCI state configuration for each TCI state index is configured through RRC signaling. In the Rel-16 NR system, a corresponding TCI state is configured between DL RSs, but configuration between DL RS and UL RS or between UL RS and UL RS may be allowed in a future release. As an example of a UL RS, there are an SRS, a PUSCH DM-RS, and a PUCCH DM-RS, etc.)

SRI: SRS resource indicator (It indicates one of SRS resource index values configured in 'SRS resource indicator' among fields in DCI for scheduling a PUSCH. When a UE transmits a PUSCH, the UE may transmit the PUSCH by using the same spatial domain transmission filter used for transmitting and receiving a reference signal associated with a corresponding SRS resource. Here, a reference RS is configured by RRC signaling through an SRS spatial relation information (SRS-SpatialRelationInfo) parameter for each SRS resource, and an SS/PBCH block, a CSI-RS, or an SRS may be configured as a reference RS.)

TRP: Transmission and Reception Point

In order to increase transmission efficiency of scheduling DCI for a PDSCH and/or PUSCH, transmission of a plurality of PDSCHs (or PUSCHs) may be supported through one DCI. For convenience, in this disclosure, a corresponding DCI is referred to as M-DCI, and DCI scheduling a single PDSCH (or PUSCH) is referred to as S-DCI.

For example, scheduling for transmission of a plurality of PDSCHs (or PUSCHs) through one DCI may be configured for a terminal by higher layer signaling (e.g., RRC signaling). Whether to schedule transmission of a plurality of PDSCHs (or PUSCHs) through one DCI may be configured for each of one or more serving cells configured for a terminal. For example, if information for configuring scheduling for transmission of a plurality of PDSCHs (or PUSCHs) through one DCI is provided for a corresponding serving cell, scheduling for transmission of a plurality of PDSCHs (or PUSCHs) through one DCI on the corresponding cell may be configured/supported. On the other hand, if information for configuring scheduling for transmission of a plurality of PDSCHs (or PUSCHs) through one DCI is not provided for a corresponding serving cell, scheduling for transmission of a plurality of PDSCHs (or PUSCHs) through one DCI on the corresponding cell may not be configured/supported.

Here, even for M-DCI, only a single PDSCH may be scheduled or a plurality of PDSCHs may be scheduled depending on the case. For example, in configuring a TDRA entry of M-DCI, only one SLIV may be linked (associated) with a certain row index #A, and a plurality of SLIVs may be linked (associated) with row index #B. Here, when row index #A is indicated in M-DCI, it may mean that the corresponding DCI schedules only a single PDSCH, on the other hand, when row index #B is indicated in M-DCI, it may mean that the corresponding DCI schedules multiple PDSCHs. For convenience, a case in which scheduling is performed through S-DCI and only one PDSCH is scheduled through M-DCI (or when SPS PDSCH release or SCell dormancy is indicated through DCI) is referred to as a single-PDSCH case, and a case in which a plurality of PDSCHs are scheduled through M-DCI is referred to as a multi-PDSCH case.

Therefore, the present disclosure propose a scheduling method for multiple PXSCHs in a Multi-PXSCH case (i.e., Multi-PDSCH case and/or Multi-PUSCH case) and a HARQ-ACK codebook (HCB) construction method corresponding to M-DCI.

For convenience of description in this disclosure, the PXSCH expression may be used to encompass PDSCH and/or PUSCH.

In the NR system, a millimeter wave (mmWave) band (e.g., above 125 or 24 GHz to 52.6 GHz) is defined as a frequency range 2 (FR2). The sub-carrier spacing (SCS) of an SS/PBCH block in the corresponding band may be either 120 or 240 KHz, and the SCS for other signals/channels (e.g., PDCCH, PDSCH, PUSCH, etc.) may be either 60 or 120 KHz.

In a high frequency NR system (e.g., above 52.6 GHz to 71 GHZ, referred to as FR3 (or FR2-2) for convenience of description) larger SCSs may be introduced. If scalability of an OFDM symbol duration and a CP length defined in the current NR system is maintained, an OFDM symbol duration and a CP length for each SCS may be defined with lengths as shown in Table 6 below.

TABLE 6

| SCS [KHz] | 120 | 240 | 480 | 960 |
|---|---|---|---|---|
| Symbol duration | 8.33 μs | 4.17 μs | 2.08 μs | 1.04 μs |
| CP length | 586 ns | 293 ns | 146 ns | 73 ns |

In the FR3 (or FR2-2) frequency band, PDCCH monitoring may be performed in one slot per a plurality of slots in consideration of monitoring capability of a terminal. An operation of scheduling a plurality of PDSCHs and/or a plurality of PUSCHs through one DCI may be introduced in consideration of the reduced PDCCH monitoring occasion area. However, a PDSCH and/or PUSCH indicated through the DCI may be indicated to be transmitted not only in the FR3 (or FR2-2) but also in another frequency range. That is, M-DCI proposed in the present disclosure is not limited to the NR system operating in FR3 (or FR2-2) and may be applied in other frequency ranges.

Embodiment 1

This embodiment relates to the maximum gap restriction between the first scheduled PXSCH and the last scheduled PXSCH in the Multi-PXSCH case.

In the existing Rel-15 NR system, one row index constituting the TDRA table may be indicated through the TDRA field of DCI, and {SLIV, mapping type) for each row index, a combination of scheduling offsets K0/K2} may be configured. Here, the scheduling offset value may be expressed as K0 in case of PDSCH and as K2 in case of PUSCH.

In M-DCI, by configuring a plurality of SLIV values in one row index, a symbol level time domain resource position of a plurality of PXSCHs may can be determined. At this time, the maximum gap (e.g., slot level gap) between the first scheduled PXSCH and the last scheduled PXSCH may be restricted to the difference between the (allowed) maximum value and the (allowed) minimum value of the scheduling offset value K0/K2 (here, K0 for PDSCH and K2 for PUSCH).

For example, when the (allowed) maximum value of the DCI-to-PDSCH scheduling offset K0 value is 32 slots and the (allowed) minimum value is 0 slots, the maximum slot level gap between the first scheduled PDSCH and the last scheduled PDSCH through M-DCI may be constrained to 32 slots (i.e., 32 slots-0 slots=32 slots). As another example, when the (allowed) maximum value of the DCI-to-PUSCH scheduling offset K2 is 32 slots and the (allowed) minimum value is 2 slots, the maximum slot level gap between the first scheduled PUSCH first scheduled and the last scheduled PUSCH through M-DCI may be constrained to 30 slots (i.e., 32 slots−2 slots=30 slots).

The 'allowed' maximum/minimum values described in this embodiment may mean maximum/minimum values that may be configured for a carrier through which PXSCH is transmitted. Alternatively, the meaning of the 'allowed' maximum/minimum value described in this embodiment may mean, if the maximum value (or minimum value) of K0 and/or K2 value is additionally configured/indicated (to the maximum/minimum value that can be configured for the carrier through which the PXSCH is transmitted), less than the corresponding maximum value (or more than the minimum value).

Embodiment 2

This embodiment relates to a method of dropping some PXSCHs scheduled through M-DCI by utilizing a rate matching indicator or an invalid symbol pattern indicator. Here, the rate matching indicator may be for PDSCH, and an invalid symbol pattern indicator may be for PUSCH. In addition, this embodiment proposes a specific drop condition related to the above-described drop scheme.

Regarding the PDSCH resource mapping method (e.g., see TS 38.214 v16.5.0, section 5.1.4), by RateMatch Pattern(s) configuration (configured by higher layer signaling) and/or indication according to rate matching indicator on DCI, a specific resource region may be determined to be unavailable for PDSCH mapping. Among a plurality of PDSCHs scheduled through M-DCI, in the case of PDSCH(s) included in (or overlapping with) the corresponding 'unavailable resource', transmission and reception of the corresponding PDSCH(s) may be skipped/omitted. Alternatively, in this case, information on whether transmission and reception of the corresponding PDSCH(s) will be skipped and/or information on whether 'unavailable resources' will be unavailable for PDSCH mapping may be configured/indicated by base station signaling. For example, corresponding base station signaling may include higher layer signaling such as RRC signaling, layer 1 signaling, and the like.

In addition, in relation to the resource allocation method for the PUSCH (in particular, resource allocation in the time domain) (e.g., refer to TS 38.214 v16.6.0, section 6.1.2), by a invalidSymbolPattern configuration (configured by higher layer signaling) and/or an indication according to an invalid symbol pattern indicator on DCI, a specific resource region may be determined to be invalid for PUSCH reception by. Among a plurality of PUSCHs scheduled through M-DCI, in the case of a PUSCH(s) included in (or overlapping with) a corresponding 'invalid resource', transmission and reception of the corresponding PUSCH(s) may be skipped. Alternatively, in this case, information on whether transmission/reception of the corresponding PUSCH(s) will be skipped and/or information on whether 'invalid resources' are not valid for PUSCH mapping may be configured/indicated by base station signaling. For example, corresponding base station signaling may include higher layer signaling such as RRC signaling, layer 1 signaling, and the like.

In this embodiment, a specific condition in which transmission and reception of the PXSCH as described above may be skipped (/omitted) is proposed.

First, in the case of multi-PDSCH scheduling DCI, the following three methods (i.e., methods 1 to 3) may be considered. At least one of the three methods described below may be defined/defined to be applied, or one of the methods described below may be determined by configuration/indication of the base station.

(Method 1) If the entire resource region of a specific PDSCH among a plurality of scheduled PDSCHs is completely included (or partially overlaps) in 'unavailable resources', transmission and reception of the corresponding PDSCH may be skipped (/omitted).

(Method 2) Even if the entire resource region of a specific PDSCH is not included in 'unavailable resources', in a case that the DMRS resource region of the corresponding PDSCH and the 'unavailable resource' area fully overlap (or partially overlap), transmission and reception of the corresponding PDSCH may be skipped (/omitted).

(Method 3) Even if the entire resource region of a specific PDSCH is not included in 'unavailable resources', if the coding rate of downlink data to be carried in the PDSCH region excluding 'unavailable resources' is higher than a specific threshold value, transmission and reception of the corresponding PDSCH may be skipped (/omitted). For example, the specific threshold value may be a specific fixed value (e.g., 0.95), a pre-defined value, or a value configured by higher layer signaling.

Next, in the case of multi-PUSCH scheduling DCI, the following three methods (i.e., method A to method C) may be considered. At least one of the three methods described below may be precised/defined to be applied, or one of the methods described below may be determined by configuration/indication of the base station.

(Method A) If the entire resource region of a specific PUSCH among a plurality of scheduled PUSCHs is completely included in 'invalid resources' (or partially overlaps), transmission and reception of the corresponding PUSCH may be skipped (/omitted).

(Method B) Even if the entire resource region of a specific PUSCH is not included in the 'invalid resource', in a case that the DMRS resource region of the corresponding PUSCH and the 'invalid resource' area fully overlap (or partially overlap), transmission and reception of the corresponding PUSCH may be skipped (/omitted).

(Method C) Even if the entire resource region of a specific PUSCH is not included in 'invalid resource', if the coding rate of uplink data to be carried in the PUSCH region excluding 'invalid resource' is higher than a specific threshold, transmission and reception of the corresponding PUSCH may be skipped (/omitted). For example, the specific threshold value may be a specific fixed value (e.g., 0.95), a pre-defined value, or a value configured by higher layer signaling.

Embodiment 3

In the NR system, activation of the semi-persistent scheduling (SPS) PDSCH may be performed by the method shown in Table 7 below (e.g., refer to TS 38.213 v16.6.0, section 10.2).

TABLE 7

| 10.2 PDCCH validation for DL SPS and UL grant Type 2 |
|---|
| A UE validates, for scheduling activation or scheduling release, a DL SPS assignment PDCCH or a configured UL grant Type 2 PDCCH if<br>- the CRC of a corresponding DCI format is scrambled with a CS-RNTI provided by cs-RNTI, and<br>- the new data indicator field in the DCI format for the enabled transport block is set to '0', and<br>- the DFI flag field, if present, in the DCI format is set to '0', and<br>- if validation is for scheduling activation and if the PDSCH-to-HARQ feedback timing indicator field in the DCI format is present, the PDSCH-to-HARQ_feedback timing indicator field does not provide an inapplicable value from dl-DataToUL-ACK-r16. |
| If a UE is provided a single configuration for UL grant Type 2 PUSCH or for SPS PDSCH, validation of the DCI format is achieved if all fields for the DCI format are set according to Table 10.2-1 or Table 10.2-2. |
| (e.g., in Table 10.2-1, "Special fields for single DL SPS or single UL grant Type 2 scheduling activation PDCCH validation when a UE is provided a single SPS PDSCH or UL grant Type 2 configuration in the active DL/UL BWP of the scheduled cell", regarding 'DCI format 1_1', for the enabled transport block, Redundancy version set to all '0's.) |
| If a UE is provided more than one configurations for UL grant Type 2 PUSCH or for SPS PDSCH, a value of the HARQ process number field in a DCI format indicates an activation for a corresponding UL grant Type 2 PUSCH or for a SPS PDSCH configuration with a same value as provided by ConfiguredGrantConfigIndex or by sps-ConfigIndex, respectively. Validation of the DCI format is achieved if the RV field for the DCI format is set as in Table 10.2-3. |
| If a UE is provided more than one configuration for UL grant Type 2 PUSCH or for SPS PDSCH<br>- if the UE is provided ConfiguredGrantConfigType2DeactivationStateList or sps-ConfigDeactivationStateList, a value of the HARQ process number field in a DCI format indicates a corresponding entry for scheduling release of one or more UL grant Type 2 PUSCH or SPS PDSCH configurations<br>- if the UE is not provided ConfiguredGrantConfigType2DeactivationStateList or sps-ConfigDeactivationStateList, a value of the HARQ process number field in a DCI format indicates a release for a corresponding UL grant Type 2 PUSCH or for a SPS PDSCH configuration with a same value as provided by ConfiguredGrantConfigIndex or by sps-ConfigIndex, respectively |
| Validation of the DCI format is achieved if all fields for the DCI format are set according to Table 10.2-4. |
| If validation is achieved, the UE considers the information in the DCI format as a valid activation or valid release of DL SPS or configured UL grant Type 2. If validation is not achieved, the UE discards all the information in the DCI format. |
| A UE is expected to provide HARQ-ACK information in response to a SPS PDSCH release after N symbols from the last symbol of a PDCCH providing the SPS PDSCH release. If processingType2Enabled of PDSCH-ServingCellConfig is set to enable for the serving cell with the PDCCH providing the SPS PDSCH release, N = 5 for $\mu$ = 0, N = 5.5 for $\mu$ = 1, and N = 11 for $\mu$ = 2, otherwise, N = 10 for $\mu$ = 0, N = 12 for $\mu$ = 1, N = 22 for $\mu$ = 2, and N = 25 for $\mu$ = 3, wherein $\mu$ corresponds to the smallest SCS configuration between the SCS configuration of the PDCCH providing the SPS PDSCH release and the SCS configuration of a PUCCH carrying the HARQ-ACK information in response to a SPS PDSCH release. |

In this regard, the resource location within the slot of the activated SPS configuration may be determined by the SLIV value indicated in the TDRA field on the corresponding SPS PDSCH activation DCI. However, when SPS PDSCH activation is performed through M-DCI, since multiple SLIVs may be linked (/associated) to a specific row index indicated through the TDRA field on M-DCI, resource location determination in the slot of SPS PDSCH may be ambiguous.

To solve this problem, the following methods can be considered.

As one method, when at least one row index among the TDRA row indexes configured in the M-DCI is linked to only a single SLIV, SPS activation through the corresponding M-DCI may be configured/defined to be allowed. In this case, when actually activating the SPS through the corresponding M-DCI, the UE may expect the TDRA row index linked with only a single SLIV to be indicated through the corresponding M-DCI.

When the method is applied, even if the SPS PDSCH activation DCI is indicated through the M-DCI, the DCI restricts scheduling resources for only one PDSCH, thereby eliminating ambiguity about the SPS PDSCH resource of the UE and reducing UE implementation complexity.

Alternatively, even if all TDRA row indexes set in M-DCI are linked to (/associated with) multiple SLIVs or some TDRA row indexes set in M-DCI are linked to (/associated with) multiple SLIVs, it may be allowed that a TDRA row index to which multiple SLIVs are linked is indicated when SPS is activated through the corresponding M-DCI. At this time, the UE may consider only a specific SLIV (e.g., the first SLIV, the last SLIV) among a plurality of SLIVs linked to the indicated TDRA row index as valid. In the case of this method, the UE may determine the time resource location of the SPS PDSCH based on the specific SLIV information, and determine the HARQ-ACK bit position when configuring the HARQ-ACK timing and HARQ-ACK codebook.

For example, when {slot n+1, SLIV #1} and {slot n+2, SLIV #2} are configured by the TDRA row index indicated in the SPS activation M-DCI transmitted in slot n, the SPS PDSCH may be activated based on the last SLIV {slot n+2, SLIV #2}. In this case, SLIV #2 of slot n+2 may be a first time resource allocated for SPS PDSCH. Accordingly, when configuring the HARQ-ACK codebook (in particular, when configuring the type-1 HARQ-ACK codebook), the UE may transmit ACK/NACK information for the SPS PDSCH at the HARQ-ACK bit position corresponding to the corresponding SLIV.

The above-described problem may also occur in uplink configured grant (CG) PUSCH type 2.

That is, the resource location in the slot of the activated CG configuration may be determined by the SLIV value indicated in the TDRA field on the corresponding CG PUSCH activation DCI. However, when CG PUSCH activation is performed through M-DCI, since multiple SLIVs may be linked to (/associated with) a specific row index indicated through the TDRA field on M-DCI, resource location determination in the slot of CG PUSCH Decisions may be ambiguous.

To solve this problem, the following methods may be considered.

As one method, when at least one row index among the TDRA row indexes configured in the M-DCI is linked to (/associated with) only a single SLIV, it may be configured/defined to allow CG activation through the corresponding M-DCI. In this case, when actually activating the CG through the corresponding M-DCI, the UE may expect the TDRA row index associated with only a single SLIV to be indicated through the corresponding M-DCI.

When this method is applied, even if the CG PUSCH activation DCI is indicated through the M-DCI, the DCI restricts scheduling resources for only one PUSCH, thereby eliminating ambiguity about the CG PUSCH resource of the UE and reducing UE implementation complexity.

Alternatively, even if all TDRA row indexes set in M-DCI are linked to (/associated with) multiple SLIVs or some TDRA row indexes configured in M-DCI are linked to (/associated with) multiple SLIVs, it may be allowed that a TDRA row index to which multiple SLIVs are linked is indicated when CG is activated through the corresponding M-DCI. At this time, the UE may consider only a specific SLIV (e.g., the first SLIV, the last SLIV) among a plurality of SLIVs linked to the indicated TDRA row index as valid. The UE may determine the time resource location of the CG PUSCH based on the specific SLIV information.

In particular, in the case of SPS PDSCH, a method of considering only the last SLIV among a plurality of SLIVs linked to (/associated with) the TDRA row index indicated through SPS activation M-DCI as valid may be considered. In addition, in the case of CG PUSCH, a method in which only the first SLIV among multiple SLIVs linked to (/associated with) the TDRA row index indicated through the CG activation M-DCI is considered valid may be considered.

Referring to Table 7 above, when activating DL SPS through DCI format 1_1, the condition that all redundancy version (RV) values corresponding to enabled transport block (TB) must be set to 0 exist. However, a rule may be required even when a TDRA row index linked to (/associated with) a plurality of SLIVs may be indicated through the corresponding DCI format 1_1. As an example, the condition in Table 7 described above may be replaced with a condition in which all RV values corresponding to enabled TBs of PDSCHs scheduled through a specific SLIV (e.g., first SLIV, last SLIV) value among a plurality of SLIVs must be set to 0. Here, the specific SLIV may be configured based on invalid SLIV(s) among a plurality of SLIVs. Alternatively, as another example, the condition in Table 7 described above may be replaced with a condition in which all RV values corresponding to enabled TBs of PDSCHs scheduled through all SLIV values among a plurality of SLIVs must be set to 0. Here, all SLIVs may be configured based on invalid SLIV(s) among a plurality of SLIVs.

In addition, in the NR system, deactivation or release of the SPS PDSCH may be performed by the method shown in Table 7 described above (e.g., refer to TS 38.213 v16.6.0, section 10.2).

In this regard, the HARQ-ACK bit position may be determined by the SLIV value indicated in the TDRA field on the corresponding SPS PDSCH deactivation DCI when configuring the HARQ-ACK timing and/or HARQ-ACK codebook. However, when performing SPS PDSCH release through M-DCI, since multiple SLIVs may be linked to (/associated with) a specific row index indicated through the TDRA field on M-DCI, HARQ-ACK timing and/or HARQ-ACK codebook configuration may be ambiguous.

To solve this problem, the following methods may be considered.

As one method, when at least one row index among the TDRA row indexes configured in the M-DCI is linked to (/associated with) only a single SLIV, it may be configured/defined to allow SPS deactivation through the corresponding M-DCI. In this case, when actually deactivating the SPS through the corresponding M-DCI, the UE may expect the TDRA row index associated with only a single SLIV to be indicated through the corresponding M-DCI.

When this method is applied, even if the SPS PDSCH deactivation DCI is indicated through the M-DCI, the DCI restricts scheduling resources for only one PDSCH, thereby eliminating ambiguity about the SPS PDSCH resource of the UE and reducing UE inplementation complexity.

Alternatively, even if all TDRA row indexes configured in M-DCI are linked to (/associated with) multiple SLIVs or some TDRA row indexes configured in M-DCI are interlocked with multiple SLIVs, it may be allowed that a TDRA row index to which multiple SLIVs are linked is indicated when SPS is deactivated through the corresponding M-DCI. At this time, the UE may consider only a specific SLIV (e.g., the first SLIV, the last SLIV) among a plurality of SLIVs linked to the indicated TDRA row index as valid. In the case of this method, the UE may determine the HARQ-ACK bit position when configuring the HARQ-ACK timing and/or HARQ-ACK codebook based on the specific SLIV information.

For example, when {slot n+1, SLIV #1} and {slot n+2, SLIV #2} are configured by the TDRA row index indicated in the SPS inactivation M-DCI transmitted in slot n, the last SLIV The SPS PDSCH may be deactivated based on {slot n+2, SLIV #2}. At this time, based on slot n+2, the HARQ-ACK timing corresponding to the SPS PDSCH may be determined, and when configuring the HARQ-ACK codebook (in particular, when configuring the type-1 HARQ- ACK codebook), the UE may transmit ACK/NACK information for the SPS PDSCH at a corresponding HARQ-ACK bit position.

Embodiment 4

This embodiment relates to a method of configuring (/constructing)/generating a HARQ-ACK codebook (HCB) by configuring one sub-codebook (sub-CB) corresponding to a single PDSCH case and configuring another sub-CB corresponding to a multi-PDSCH case.

In configuring the Type-2 HCB, when configuring the sub-CB corresponding to the multi-PDSCH case, it may be configured/defined to generate the HCB based on the maximum number of schedulable PDSCHs regardless of the number of PDSCHs actually scheduled in the M-DCI.

However, when constructing a sub-CB corresponding to a multi-PDSCH case, if the UE receives only one M-DCI, the UE may be configured to construct the corresponding sub-CB with the number of actually scheduled PDSCHs, not the maximum number of schedulable PDSCHs. In addition, when constructing a sub-CB corresponding to a multi-PDSCH case, even when a UE receives multiple M-DCIs, the UE may be configured to construct the corresponding sub-CB with HARQ-ACK bits corresponding to the number of actually scheduled PDSCHs, not the maximum number of schedulable PDSCHs, exceptionally for the last M-DCI received last.

However, the above-described method may cause ambiguity in a specific situation, such as a situation in which M_DCI is configured in a plurality of cells. For example, if the base station transmits two M-DCI 1 and M-DCI 2, M-DCI 1 indicates {C-DAI=x, T-DAI=x+1}, and M-DCI 2 indicates {C-DAI=x+1, T-DAI=x+1} in the last slot, the size of the payload fed back by the UE may vary depending on which DCI the UE misses, and accordingly, decoding of the HARQ-ACK feedback information of the base station may be difficult.

However, in the case of a single DL carrier (or single DL serving cell) operation in which CA (carrier aggregation) is not configured (hereinafter referred to as a non-CA case), the ambiguity problem can be solved. Alternatively, even when CA is configured, even when M-DCI is configured only on a single DL carrier (or single DL serving cell) (hereinafter, referred to as a non-CA M-DCI case), the ambiguity problem can be solved. Therefore, application of the above-described proposed operation may be limited to the non-CA case or only to the non-CA M-DCI case.

In addition, when configuring CBG, a method of configuring three sub-CBs and a method of configuring two sub-CBs may also be considered. At this time, it may be determined according to which of the two methods the Type-2 HCB will be configured by capability information signaling of the UE and/or base station configuration.

Embodiment 5

This embodiment relates to a downlink assignment indicator (DAI) counting scheme when multiple DCIs are received in one PDCCH monitoring occasion (MO).

In the NR system, the UE may inform the base station whether to support type2-HARQ-ACK-Codedbook through UE capability information signaling. The corresponding capability information means that the UE may receive multiple PDSCH scheduling DCIs in the same PDCCH MO, and in this case, a rule of counting the DAI value first from the DCI having the earliest corresponding PDSCH reception timing among the two DCIs has been defined. Table 8 is an example of existing DAI counting rules (e.g., see TS 38.213 v16.6.0, section 9.1.3.1).

TABLE 8

| 9.1.3.1 Type-2 HARQ-ACK codebook in physical uplink control channel |
|---|
| A UE determines monitoring occasions for PDCCH with DCI format scheduling PDSCH receptions or SPS PDSCH release or indicating SCell dormancy on an active DL BWP of a serving cell c, as described in clause 10.1, and for which the UE transmits HARQ-ACK information in a same PUCCH in slot n based on<br>- PDSCH-to-HARQ_feedback timing indicator field values for PUCCH transmission with HARQ-ACK information in slot n in response to PDSCH receptions, SPS PDSCH release or SCell dormancy indication<br>- slot offsets $K_0$ [6, TS 38.214] provided by time domain resource assignment field in a DCI format scheduling PDSCH receptions and by pdsch-AggregationFactor, or pdsch-AggregationFactor-r16, or repetitionNumber, when provided.<br>The set of PDCCH monitoring occasions for a DCI format scheduling PDSCH receptions or SPS PDSCH release or indicating SCell dormancy is defined as the union of PDCCH monitoring occasions across active DL BWPs of configured serving cells. PDCCH monitoring occasions are indexed in an ascending order of their start times. The cardinality of the set of PDCCH monitoring occasions defines a total number M of PDCCH monitoring occasions.<br>A value of the counter downlink assignment indicator (DAI) field in DCI formats denotes the accumulative number of {serving cell, PDCCH monitoring occasion}-pair(s) in which PDSCH reception(s), SPS PDSCH release or SCell dormancy indication associated with the DCI formats is present up to the current serving cell and current PDCCH monitoring occasion,<br>- first, if the UE indicates by type2-HARQ-ACK-Codebook support for more than one PDSCH reception on a serving cell that are scheduled from a same PDCCH monitoring occasion, in increasing order of the PDSCH reception starting time for the same {serving cell, PDCCH monitoring occasion} pair,<br>- second in ascending order of serving cell index, and<br>- third in ascending order of PDCCH monitoring occasion index m, where $0 \leq m < M$. |

However, when PDSCHs are scheduled through M-DCI, since a plurality of SLIVs may be linked to (/associated with) a specific row index indicated through the TDRA field on M-DCI, it may become ambiguous as to which DAI value to count based on the reception timing of which PDSCH.

In order to solve this problem, a rule may be defined to count the DAI value based on the PDSCH reception timing corresponding to a specific SLIV (e.g., the first SLIV, the last SLIV) among a plurality of SLIVs linked to the TDRA row index indicated on the M-DCI.

In addition, among the plurality of SLIVs, for reasons such as the method in Embodiment 2 or conflict with a semi-static UL configuration (e.g., configuration through tdd-UL-DL-ConfigurationCommon or tdd-UL-DL-ConfigurationDedicated), transmission and reception of a PDSCH corresponding to a specific SLIV may be canceled/dropped/skipped. Considering this, a rule may be determined to count the DAI value based on the PDSCH reception timing corresponding to a specific SLIV among a plurality of SLIVs linked to (/associated with) the TDRA row index indicated on M-DCI. For example, the corresponding specific SLIV may be the first 'transmission' SLIV or the last 'transmission' SLIV.

Hereinafter, Tables 9 to 11 are examples of DAI counting rules according to the method proposed in this embodiment.

TABLE 9

| |
|---|
| A value of the counter downlink assignment indicator (DAI) field in DCI formats denotes the accumulative number of {serving cell, |

TABLE 9-continued

| |
|---|
| PDCCH monitoring occasion}-pair(s) in which PDSCH reception(s), SPS PDSCH release or SCell dormancy indication associated with the DCI formats is present up to the current serving cell and current PDCCH monitoring occasion, |
| - first, if the UE indicates by type2-HARQ-ACK-Codebook support for more than one PDSCH reception on a serving cell that are scheduled from a same PDCCH monitoring occasion, in increasing order of the first PDSCH reception starting time for the same {serving cell, PDCCH monitoring occasion} pair, |
| - second in ascending order of serving cell index, and |
| - third in ascending order of PDCCH monitoring occasion index m, where 0 ≤ m < M. |

TABLE 10

| |
|---|
| A value of the counter downlink assignment indicator (DAI) field in DCI formats denotes the accumulative number of {serving cell, PDCCH monitoring occasion}-pair(s) in which PDSCH reception(s), SPS PDSCH release or SCell dormancy indication associated with the DCI formats is present up to the current serving cell and current PDCCH monitoring occasion, |
| - first, if the UE indicates by type2-HARQ-ACK-Codebook support for more than one PDSCH reception on a serving cell that are scheduled from a same PDCCH monitoring occasion, in increasing order of the first scheduled PDSCH reception starting time for the same {serving cell, PDCCH monitoring occasion} pair, |
| - second in ascending order of serving cell index, and |
| - third in ascending order of PDCCH monitoring occasion index m, where 0 ≤ m < M. |

TABLE 11

| |
|---|
| A value of the counter downlink assignment indicator (DAI) field in DCI formats denotes the accumulative number of {serving cell, PDCCH monitoring occasion}-pair(s) in which PDSCH reception(s), SPS PDSCH release or SCell dormancy indication associated with the DCI formats is present up to the current serving cell and current PDCCH monitoring occasion, |
| - first, if the UE indicates by type2-HARQ-ACK-Codebook support for more than one PDSCH reception on a serving cell that are scheduled from a same PDCCH monitoring occasion, in increasing order of the first transmitted PDSCH reception starting time for the same {serving cell, PDCCH monitoring occasion} pair, |
| - second in ascending order of serving cell index, and |
| - third in ascending order of PDCCH monitoring occasion index m, where 0 ≤ m < M. |

Referring to Table 9, the DAI value may be counted based on the first PDSCH reception start timing. Referring to Table 10, the DAI value may be counted based on the first scheduled PDSCH reception start timing. Referring to Table 11, the DAI value may be counted based on the first transmitted PDSCH reception start timing.

Embodiment 6

This embodiment relates to an out-of-order (OoO) handling scheme in a multi-PXSCH case.

In the NR system, out-of-order related items for the PDSCH are defined. Specifically, in a case that the first PDSCH and the second PDSCH are distinguished according to the time axis precedence relationship of scheduled resources, when the HARQ-ACK slot j corresponding to the first PDSCH is configured, and the HARQ-ACK slot i corresponding to the second PDSCH is set, a situation where i<j may be defined as ouf-of-order, and the UE may not expect such an out-of-order situation (e.g., TS 38.213 v15.13.0, section 5.1 reference). This is because the complexity of UE implementation may increase if the PDSCH order and the HARQ-ACK transmission order are reversed from the UE side.

Figure 10:
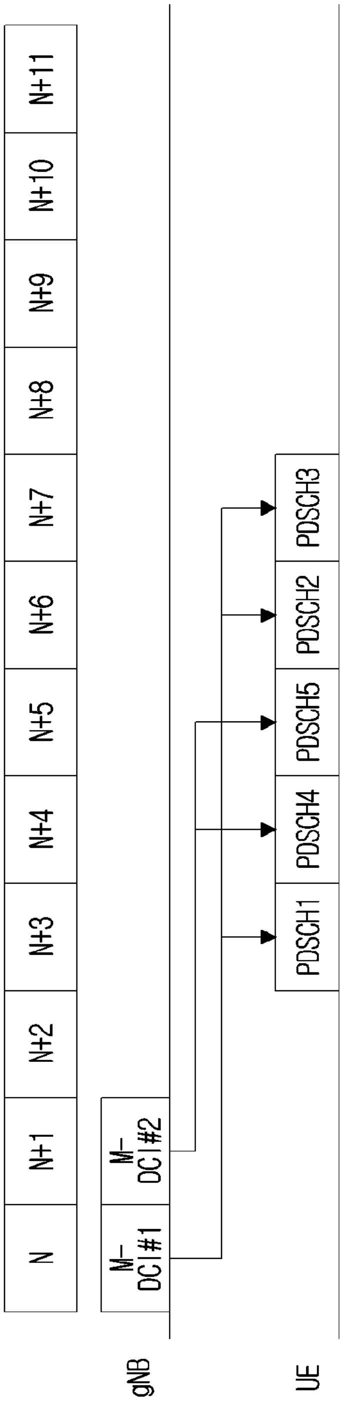
FIG. 10 is an example of a method of scheduling multiple PDSCHs according to an embodiment of the present disclosure.

FIG. 10 is an example of a method of scheduling multiple PDSCHs according to an embodiment of the present disclosure.

Referring to FIG. 10, a first M-DCI (i.e., M-DCI #1) may schedule multiple PDSCHs (i.e., PDSCH #1, PDSCH #2, and PDSCH #3) on non-contiguous slots, and the second M-DCI (i.e., M-DCI #2) may schedule multiple PDSCHs (ie, PDSCH #4 and PDSCH #5) on slot N+4 and slot N+5.

If the HARQ-ACK timing indicated through the first M-DCI is slot N+10 and the HARQ-ACK timing indicated through the second M-DCI is slot N+11, no out-of-order situation occurs between PDSCH #1 and PDSCH #4/PDSCH #5. However, in this case, an out-of-order situation may occur between PDSCH #2/PDSCH #3 and PDSCH #4/PDSCH #5. Therefore, when the HARQ-ACK timing corresponding to each DCI (or M-DCI) is different during scheduling as shown in FIG. 10, an out-of-order situation may occur between some PDSCHs.

In order to solve such a problem, the following methods may be considered.

Embodiment 6-1

For example, the UE may be configured/defined to consider that scheduling for PDSCH(s) not related to the out-of-order situation is valid and scheduling for PDSCH(s) related to the out-of-order situation is invalid. In this case, when the UE feeds back the HARQ-ACK information, the HARQ-ACK bit(s) corresponding to the PDSCH(s) deemed invalid may be padded with NACK, or HARQ-ACK bit(s) corresponding to the corresponding PDSCH(s) may be omitted (/skipped).

As a specific example, referring to FIG. 10, the UE may consider that PDSCH #1/PDSCH #4/PDSCH #5 not related to the out-of-order situation are valid, and PDSCH #2/PDSCH #3 related to the out-of-order situation are invalid. In this case, when the UE feeds back HARQ-ACK information through slot N+10, the HARQ-ACK bit(s) corresponding to PDSCH #2/PDSCH #3 may be padded with NACK or HARQ-ACK bit(s) corresponding to PDSCH #2/PDSCH #3 may be omitted (/skipped).

Alternatively, the UE may consider that that PDSCH #1 not related to the out-of-order situation is valid and PDSCH #2/PDSCH #3/PDSCH #4/PDSCH #5 related to the out-of-order situation are not valid. In this case, when the UE feeds back HARQ-ACK information through slot N+10, the HARQ-ACK bit(s) corresponding to PDSCH #2/PDSCH #3 are padded with NACK or HARQ-ACK bit(s) corresponding to PDSCH #2/PDSCH #3 may be omitted (/skipped). In addition, when the UE feeds back HARQ-ACK information through slot N+11, the HARQ-ACK bit(s) corresponding to PDSCH #4/PDSCH #5 may be padded with NACK, or HARQ-ACK bit(s) corresponding PDSCH #4/PDSCH #5 may be omitted (/skipped).

Embodiment 6-2

For another example, the UE may ignore/discard the DCI corresponding to the PDSCH(s) related to the out-of-order situation. In this case, when the UE feeds back HARQ-ACK information, the HARQ-ACK bit(s) corresponding to the PDSCH(s) scheduled through the corresponding DCI may be padded with NACK, or the HARQ-ACK bit(s) corresponding to the corresponding PDSCH(s) may be omitted (/skipped).

As a specific example, referring to FIG. 10, the UE may consider that the first DCI (i.e., M-DCI #1) corresponding to PDSCH #2/PDSCH #3 related to the out-of-order situation is invalid. In this case, when the UE feeds back HARQ-ACK information through slot N+10, HARQ-ACK bit(s) corresponding to PDSCH #1/PDSCH #2/PDSCH #3 scheduled through the first DCI (i.e., M-DCI #1) may be padded with NACK, or HARQ-ACK bit(s) corresponding to PDSCH #1/PDSCH #2/PDSCH #3 may be omitted, or HARQ-ACK information feedback itself may be omitted (/skipped).

Embodiment 6-3

For another example, when there is a PDSCH(s) related to an out-of-order situation, the UE may ignore/discard some DCIs (e.g., a DCI received first or a DCI received later) among a plurality of DCIs (including M-DCI). can be ignored/discarded. In this case, when the UE feeds back HARQ-ACK information, the HARQ-ACK bit(s) corresponding to the PDSCH(s) scheduled through the corresponding DCI may be padded with NACK, or the HARQ-ACK corresponding to the corresponding PDSCH(s) ACK bit(s) may be omitted (/skipped).

As a specific example, referring to FIG. 10, since an out-of-order situation has occurred, the UE may consider that the first received DCI among the first DCI (i.e., M-DCI #1) and the second DCI (i.e., M-DCI #2) is invalid. In this case, when the UE feeds back HARQ-ACK information through slot N+10, HARQ-ACK bit(s) corresponding to PDSCH #1/PDSCH #2/PDSCH #3 scheduled through the first DCI (i.e., M-DCI #1) may be padded with NACK, or HARQ-ACK bit(s) corresponding to PDSCH #1/PDSCH #2/PDSCH #3 may be omitted (/skipped), or HARQ-ACK information feedback itself may be omitted (/skipped).

Alternatively, in addition to the above-described methods, the UE may be defined to expect that an out-of-order situation will occur between any two PDSCHs for a plurality of PDSCHs scheduled by different DCIs (each scheduling one or more PDSCHs).

Regarding the application of the above method (e.g., embodiments 6-1 to 6-3), different methods may be applied depending on whether multiple PDSCH occasions scheduled by one DCI is composed of one transport block (TB) or individual TBs. For example, when configured with individual TBs, the UE may perform HARQ-ACK feedback by determining the validity of individual PDSCHs. On the other hand, when configured with one TB, the UE may perform HARQ-ACK feedback by determining the validity of each DCI.

Embodiment 7

This embodiment relates to a method of configuring/ensuring a gap for performing beam switching and/or Listen Before Talk (LBT) when a reception (or transmission) beam is changed in the middle during continuous PDSCH reception (or PUSCH transmission).

Figure 11:
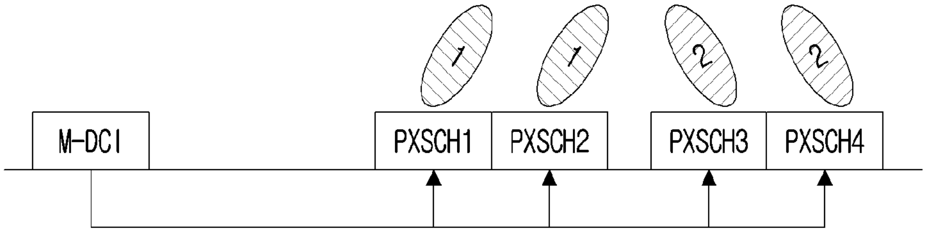
FIG. 11 is an example of a method of scheduling multiple PXSCHs according to an embodiment of the present disclosure.

FIG. 11 is an example of a method of scheduling multiple PXSCHs according to an embodiment of the present disclosure.

Referring to FIG. 11, four PXSCHs (PXSCH #1, PXSCH #2, PXSCH #3, and PXSCH #4) are scheduled through one M-DCI. Among the corresponding PXSCHs, the preceding two PXSCHs (i.e., PXSCH #1 and PXSCH #2) may be configured to be transmitted and received based on the first beam (beam 1), and the remaining two PXSCHs (i.e., PXSCH #3 and PXSCH #4) may be configured to be transmitted and received (e.g., PUSCH transmission, PDSCH reception) based on the second beam (beam 2).

At this time, when the first beam and the second beam do not have a QCL relationship with each other, the UE may perform PXSCH transmission and reception by changing the beam after transmission and reception of PXSCH #2, and for this, the beam swhiching time (hereinafter, beam switching gap, BSG) may be required.

In addition, when switching the beam, a gap (referred to as LBT gap) considering the channel access procedure (CAP) of the unlicensed band may be required. This is because the beam direction when performing CAP for transmission and reception of PXSCH #1 and the beam direction when performing CAP for transmission and reception of PXSCH #3 are different, so additional CAP performance may be required before transmission and reception of PXSCH #3 for fair coexistence.

In this embodiment, as described above, when the gap between PXSCH #2 and PXSCH #3 is smaller than the required LBT gap and/or BCG, a method of transmitting and receiving by a UE and/or a base station will be proposed.

Different beams (direction or index) in the present disclosure may mean that there is no QCL relationship, or that the QCL sources constituting the TCI state corresponding to the corresponding PXSCH are different, or it may mean that spatial relation information corresponding to the corresponding PXSCH is different. A beam (direction or index) in the present disclosure may mean a TCI state corresponding to a corresponding PXSCH or spatial relation info corresponding to the corresponding PXSCH.

In addition, PXSCH in the present disclosure may mean a (valid) PXSCH that is not dropped/skipped due to collision with a DL/UL symbol configured by a semi-static RRC parameter. Additionally/alternatively, PXSCH in the present disclosure may refer to a PXSCH scheduled through DCI (regardless of collision with a DL/UL symbol configured by a semi-static RRC parameter).

In addition, in this embodiment, the value corresponding to the LBT gap and/or BSG may be pre-defined or configured/indicated through higher layer signaling (e.g., RRC signaling, MAC-CE, etc.) and/or DCI.

Embodiment 7-1

As described above, with reference to FIG. 11, when the "gap between PDSCH #2 and PDSCH #3" (indicated through DCI and/or configured through RRC signaling, etc.) is smaller than the LBT gap and/or BSG (alternatively, when "gap between PDSCH #2 and PDSCH #3" does not exist as 0 symbol), operation examples of a UE and/or a base station are described. At least one operation method of the examples described below may be applied.

(Example 1) The base station may be configured/defined to drop/skip transmission of PDSCH #3 (or PDSCH #2). In this case, the UE may not expect reception of the corresponding PDSCH #3 (or PDSCH #2).

(Example 2) The base station may be configured/defined not to transmit some symbols of PDSCH #3 (or PDSCH #2) (e.g., the first N symbols for PDSCH #3 and the last M symbols for PDSCH #2). In this case, when the UE receives PDSCH #3 (or PDSCH #2) excluding N symbols of PDSCH #3 (or M symbols of PDSCH #2), it may be assumed that the corresponding N symbols (or M symbols) are rate-matching or punctured.

(Example 3) When the above-described value of N (or M) is equal to or less than the specific value K, the above-described Example 1 or Example 2 may be applied. Here, the specific value K may be pre-defined (e.g., 2), configured/indicated through higher layer signaling (e.g., RRC signaling, MAC-CE), or DCI. At this time, the N (or M) value may be the (minimum) number of symbols required to generate a gap greater than or equal to the LBT gap and/or BSG.

Alternatively, the above-described "gap between PDSCH #2 and PDSCH #3" may always be defined to be scheduled with a value greater than or equal to the LBT gap and/or BSG, and the UE may expect to be scheduled in this way. If, the aforementioned "gap between PDSCH #2 and PDSCH #3" is scheduled smaller than the LBT gap and/or BSG through a specific M-DCI, the UE may operate to discard the corresponding M-DCI.

Embodiment 7-2

As described above, referring to FIG. 11, when the "gap between PUSCH #2 and PUSCH #3" (indicated through DCI and/or configured through RRC signaling, etc.) is smaller than the LBT gap and/or BSG (alternatively, if "gap between PUSCH #2 and PUSCH #3" does not exist as 0 symbol), operation examples of the UE and/or the base station will be described. At least one operation method of the examples described below may be applied.

(Example A) The UE may be configured/defined to drop/skip PUSCH #3 (or PUSCH #2) transmission. In this case, the base station may not expect reception of the corresponding PUSCH #3 (or PUSCH #2).

(Example B) The UE may be configured/defined not to transmit some symbols of PUSCH #3 (or PUSCH #2) (e.g., the first N symbols for PUSCH #3 and the last M symbols for PUSCH #2). That is, the UE may perform rate matching or puncturing on corresponding N symbols (or M symbols). In this case, when the base station receives PUSCH #3 (or PUSCH #2) excluding N symbols of PUSCH #3 (or M symbols of PUSCH #2), it may be assumed that the corresponding N symbols (or M symbols) are rate matching or punctured.

(Example C) When the above-described value of N (or M) is less than or equal to a specific value K, the above-described example A or example B may be applied. Here, the specific value K may be pre-defined (e.g., 2), or configured/indicated through higher layer signaling (e.g., RRC signaling, MAC_CE), or DCI. At this time, the N (or M) value may be the (minimum) number of symbols required to make a gap greater than or equal to the LBT gap and/or BSG.

Alternatively, the above-described "gap between PUSCH #2 and PUSCH #3" may always be defined to be scheduled with a value greater than or equal to the LBT gap and/or BSG, and the UE may expect to be scheduled in this way. If, through a specific M-DCI, the above-described "gap between PUSCH #2 and PUSCH #3" is scheduled smaller than the LBT gap and/or BSG, the UE may operate to discard the corresponding M-DCI.

In this embodiment, scheduling through M-DCI is taken as an example, but The method proposed in this embodiment can be equally extended and applied to cases where PXSCH #2 and PXSCH #3 are scheduled respectively through multiple DCIs and/or multiple M-DCIs. For example, PXSCH #1 and PXSCH #2 may be scheduled through a first DCI (i.e., M-DCI #1), and PXSCH #3 and PXSCH #4 may be scheduled through a second DCI (i.e., M-DCI #2).

In this case, beam information corresponding to PXSCH #2 and PXSCH #3 may be directly indicated in the corresponding DCI, or part of the beam information may be directly indicated through the DCI and the remaining may be determined by a pre-configured rule, etc. Alternatively, all of the beam information may be determined by a pre-configured rule or the like. For example, if the offset between DCI and PDSCH #2 is less than timeDurationForQCL, beam information configured to the lowest index CORESET in the PDCCH monitoring slot closest to PDSCH #2 (or PDSCH #1) may be applied to corresponding PDSCH #2. If the offset between DCI and PDSCH #3 is equal to or greater than timeDurationForQCL, beam information indicated through DCI may be applied to PDSCH #3. Here, the timeDurationForQCL information may mean a threshold value configured/defined to distinguish a beam application method through comparison with a time offset between a DCI and a PDSCH scheduled by the corresponding DCI (e.g., TS 38.214 section 5.1.5).

Embodiment 8

This embodiment relates to a method of handling out-of-order scheduling issues when scheduling through M-DCI.

In the existing NR system, it is specified that the UE does not expect out-of-order scheduling. At this time, additional handling for out-of-order scheduling in consideration of M-DCI newly introduced in the Rel-17 standard (i.e., DCI scheduling multiple PDSCHs through one DCI) may be required.

For example, regardless of scheduling through M-DCI and/or scheduling through S-DCI, the existing out-of-order rule (or a newly introduced out-of-order rule) is applied to any two DCI and each PDSCH (scheduled through the corresponding DCI), respectively, and the UE may not expect out-of-order scheduling for all PDSCHs. At this time, the corresponding PDSCH may be a PDSCH based on SLIV configured in a row index (hereinafter, option 1), or may be a PDSCH which does not overlap with UL symbol(s) configured by higher layer signaling (e.g., tdd-UL-DL-ConfigurationCommon or tdd-DL-UL-ConfigurationDedicated) (hereinafter, option 2). In the case of the out-of-order rule according to option 1, there is an advantage in that UE implementation is simple in that it does not determine whether the UE collides with a semi-static UL symbol. In the case of the out-of-order rule according to option 2, an invalid PDSCH that collides with a semi-static UL symbol is excluded from the out-of-order rule, thereby providing an advantage in terms of scheduling flexibility.

Figure 12:
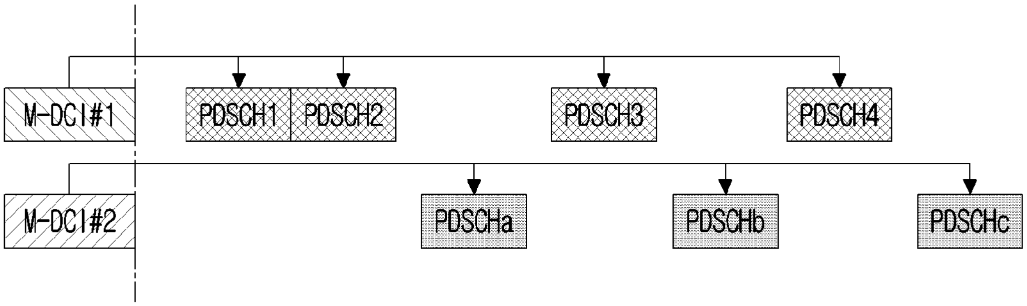
FIG. 12 is an example of a method of scheduling multiple PDSCHs based on multiple M-DCIs according to an embodiment of the present disclosure.

FIG. 12 is an example of a method of scheduling multiple PDSCHs based on multiple M-DCIs according to an embodiment of the present disclosure.

Referring to FIG. 12, it is assumed that a plurality of M-DCIs have the same ending symbol index. In this case, the existing out-of-order rule may not be applied. However, considering the PDSCH reception implementation of the UE, regardless of whether the ending symbol indexes of the plurality of DCIs are the same, PDSCH reception in the form of interlace as in FIG. 12 may not be desirable.

As in FIG. 12, when the ending symbols of two M-DCIs (i.e., M-DCI #1 and M-DCI #2) (or M-DCI and S-DCI) are the same and the case where interlaced PDSCHs exist is considered out-of-order scheduling, scheduling flexibility is reduced, so a rule for dropping some PDSCH(s) may be configured/defined in consideration of UE implementation complexity, instead of allowing interlaced PDSCH scheduling. Here, the case where the ending symbols of the two M-DCIs are the same and interlaced PDSCHs exist may mean a case where 'span 1' from the first PDSCH indicated to be received from M-DCI #1 to the last PDSCH and 'span 2' from the first PDSCH indicated to be received from M-DCI #2 to the last PDSCH overlap each other.

In this case, the corresponding PDSCH may be a PDSCH based on SLIV configured in a row index (hereinafter, option A), or may be a PDSCH which does not overlap with UL symbol(s) configured by higher layer signaling (e.g., tdd-UL-DL-ConfigurationCommon or tdd-DL-UL-ConfigurationDedicated) (hereinafter, option B). That is, even if interlace PDSCH scheduling is based on the configured SLVI, if it is not interlaced PDSCH scheduling based on an effective SLIV to which option B is applied, it may be not considered as out-of-order scheduling, and the PDSCH may not be dropped.

Regarding the method proposed in this embodiment, at least one of the following out-of-order rules may be applied.

(Rule 1)

A rule may be configured/defined to drop transmission of a PDSCH (e.g., PDSCHa, PDSCHb in FIG. 12) scheduled by other DCI (e.g., M-DCI #2 in FIG. 12) which is faster than the scheduled PDSCH(s) scheduled by DCI (e.g., M-DCI #1 in FIG. 12) scheduling the fastest PDSCH (e.g., PDSCH1 in FIG. 12).

(Rule 2)

A rule may be configured/defined to drop transmission of a PDSCH (e.g., PDSCH3, PDSCH4 in FIG. 12) scheduled by other DCI (e.g., M-DCI #1 in FIG. 12) which is later than the scheduled PDSCH(s) scheduled by DCI (e.g., M-DCI #2 in FIG. 12) scheduling the latest PDSCH (e.g., PDSCHc in FIG. 12).

(Rule 3)

Information indicating which of the above-described rule 1 and rule 2 is to be applied may be configured by higher layer signaling. Alternatively, in a case that there are N number of PDSCHs to be dropped through rule 1 and M number of PDSCHs to be dropped through rule 2, (so that the number of dropped PDSCHs can be minimized) if N<M (or N<=M) rule 1 is applied, or may be configured/defined so that Rule 2 applies.

Embodiment 9

This embodiment relates to a method for configuring a type-2 HARQ-ACK codebook (HCB) according to whether HARQ operation is enabled/disabled.

Specifically, when whether to enable/disable HARQ operation (including HARQ-ACK feedback operation) for all or some HARQ process numbers (HPN) may be configured by higher layer signaling (alternatively, when it may be dynamically indicated through DCI), a method of configuring (/constructing) type-2 HCB will be proposed. In this embodiment, the type-2 HCB may include an enhanced type-2 HCB.

Embodiment 9-1

First, among entire K HPNs (configured) for a specific cell, a method for configuring (/constructing) type-2 HCB in the case where the number of HPNs enabled for HARQ operation is 1 (or 0) and the number of disabled HPNs is K−1 (or K).

For example, when DAI is counted for each DCI, even in the multi-PDSCH case, valid HARQ-ACK bits corresponding to each DCI may be up to 1 bit (however, when 2-TB is enabled, up to 2 bits), a single codebook (CB) may be configured (/constructed) for a single-PDSCH case and a multi-PDSCH case corresponding to a cell. Here, configuring a single CB may mean a structure in which C-DAI/T-DAI values are counted and signaled by considering both the single-PDSCH case and the multi-PDSCH case. That is, in configuring a single CB, the order and/or the total of scheduled DCI/PDSCHs may be determined/signaled without distinction for each case.

In particular, when the number of HPNs in which HARQ operation is enabled for each of all cell(s) in which multi-PDSCH DCI is set within the same PUCCH cell group is 1 or less, (when CBG is not configured), a single CB may be configured by (commonly) counting the DAI values for the single-PDSCH case and the multi-PDSCH case within the corresponding PUCCH cell group. At this time, it may be done in parallel without independently counting the DAI for the single-PDSCH case and the multi-PDSCH case and not configuring individual sub-CBs. In addition, in this case, individual DAI fields/information may not be configured/indicated, and only one common DAI field/information may be configured/indicated, through UL grant DCI, for single-PDSCH case and multi-PDSCH case.

Embodiment 9-2

Next, a method of configuring type-2 HCB in a case that the number of HPNs for which HARQ operation is enabled is N (N>1) and the number of HPNs for which HARQ operation is disabled is K-N, among a total of K HPNs (configured) for specific cell in which multi-PDSCH DCI is configured. Alternatively, a method of configuring type-2 HCB in a case that the number of HPNs for which HARQ operation is enabled is N (N>1) and the number of HPNs for which HARQ operation is disabled is K-N, among a total of K HPNs (configured) for at least one cell among a plurality of cells in which multi-PDSCH DCI within a PUCCH cell group is configured.s For example, when DAI is counted for each DCI, one sub-CB corresponding to a single-PDSCH case (hereinafter referred to as a first sub-CB) may be configured, and another sub-CB corresponding to a multi-PDSCH case. (hereinafter, a second sub-CB) may be configured. Here, configuring individual sub-CBs may mean a structure in which C-DAI/T-DAI values are independently determined and signaled for each sub-CB. That is, the order and/or total sum of DCI/PDSCHs scheduled for each sub-CB may be independently determined/signaled.

According to the above-described example, if the number of enabled HPNs among HPNs scheduled through M-DCI (or S-DCI) is 1 or less, the UE may map the HARQ-ACK bit(s) corresponding to the DCI to the first sub-CB. Additionally, if the number of enabled HPNs among HPNs scheduled through M-DCI (or S-DCI) is 2 or more, the UE may map the HARQ-ACK bit(s) corresponding to the DCI to the second sub-CB.

In this case, for the second sub-CB, the number of HARQ-ACK bits corresponding to one DAI value may be calculated based on max_XY or min (max_HPN, max_XY) values.

Here, the max_HPN value may mean the maximum value among the numbers of enabled HPNs configured in each of a plurality of cells in which multi-PDSCH DCI is configured in the same PUCCH cell group. For example, when cell #1 and cell #2 belong to the same PUCCH cell group and multi-PDSCH scheduling DCI is configured for both cells, the number of HPNs for which HARQ operation is enabled for cell #1 is 3, and if the number of HPNs for which HARQ operation is enabled for cell #2 is 4, the max_HPN may be 4. As another example, when 2 TB is configured for cell #1, spatial bundling is not configured, and 2 TB is not configured for cell #2, max_HPN may be 6. Here, considering 2 bits for each PDSCH for cell #1, max_HPN being 6 may mean that 6, the maximum value among 6 bits for cell #1 and 4 bits for cell #2, is set as max_HPN.

In addition, the max_XY value may be defined as the maximum X*Y value of any cell (in one cell group) when M-DCI is configured for a plurality of cells. Here, Y is the maximum number of PDSCHs that may be scheduled by M-DCI, and X may be calculated as 1 for a cell in which 2 TB is configured but spatial bundling is configured or 1 TB is configured.

Additionally/alternatively, based on the max_HPN and max_XY values for each cell, Z=min (max_HPN, max_XY) may be determined for each cell, and the number of HARQ-ACK bits corresponding to one DAI value may be calculated based on the maximum value of the Z values of each cell.

As described above, when the number of HARQ-ACK bits corresponding to one DAI value is calculated based on max_XY or min (max_HPN, max_XY) values, a method of mapping the HARQ-ACK bit(s) corresponding to the enabled HPN within the HARQ-ACK payload corresponding to one DAI value to the lowest (or highest) bit index(s) may be applied. In addition, a method of mapping a bit with a lower HARQ ID to a lower (or higher) bit index or mapping a bit with an earlier PDSCH reception time to a lower (or higher) bit index may be applied, for HARQ-ACK bits corresponding to enabled HPN.

In addition, in relation to the method described in this embodiment, one HPN value may be indicated through M-DCI, and the indicated HPN value may be increased by 1 from the first PDSCH and mapped to each PDSCH. In this case, a modulo operation may be applied in relation to PDSCH mapping, if necessary. Here, the corresponding PDSCH may be limited to a valid PDSCH, and the valid PDSCH may mean a PDSCH that does not overlap with the UL symbol(s) configured by higher layer signaling (e.g., tdd-UL-DL-ConfigurationCommon or tdd-UL-DL-ConfigurationDedicated).

Embodiment 10

This embodiment relates to a PUCCH power control scheme when a Type-2 HARQ-ACK codebook (HCB) is configured. Specifically, when Type-2 HCB is configured, a method of determining nHARQ-ACK values during PUCCH power control when the UCI payload size is 11 bits or less will be proposed.

In the NR system, when the UCI payload size (e.g., $O_{ACK}$+$O_{SR}$+$O_{CSI}$) transmitted through PUCCH or PUSCH is (3 bits or more) 11 bits or less, the corresponding UCI information may be encoded based on Reed-Muller (RM) coding. In this case, when the UCI payload size is 11 bits or less, the UE may calculate nHARQ-ACK values for determining PUCCH transmit power as in the following example (e.g., refer to TS 38.213 v17.1.0, section 9.1.3.1).

As a specific example, in relation to receiving unicast data, if the UE does not receive $$\left(V_{DAI,m_{last}}^{DL} - \sum_{c=0}^{N_{cells}^{DL}-1} U_{DAI,c}\right)\text{mod}(T_D)$$

number of DCI, since the corresponding UE does not recognize the number of TBs actually scheduled by the base station, it conservatively calculates the number of TBs equal to NTB,maxDL. On the other hand, for the PDSCH received through the actually received DCI, the UE may calculate the $n_{HARQ-ACK}$ value based on the number of actually received TBs, PDSCHs, or bundling groups, based on the $$N_{m,c}{}^{received}$$

parameter.

However, in relation to the calculation of nHARQ-ACK, in the case of the existing formula (e.g., see TS 38.213 v17.1.0, section 9.1.3.1), by performing a modular operation using TD on the difference between the counter DAI value received from the last DCI and the number of detected DCIs $$\left(\text{i.e., } V_{DAI,m_{last}}^{DL} - \sum_{c=0}^{N_{cells}^{DL}-1} U_{DAI,c}\right),$$

the case where the UE does not receive more DCIs than TD may not be considered.

Figure 13:
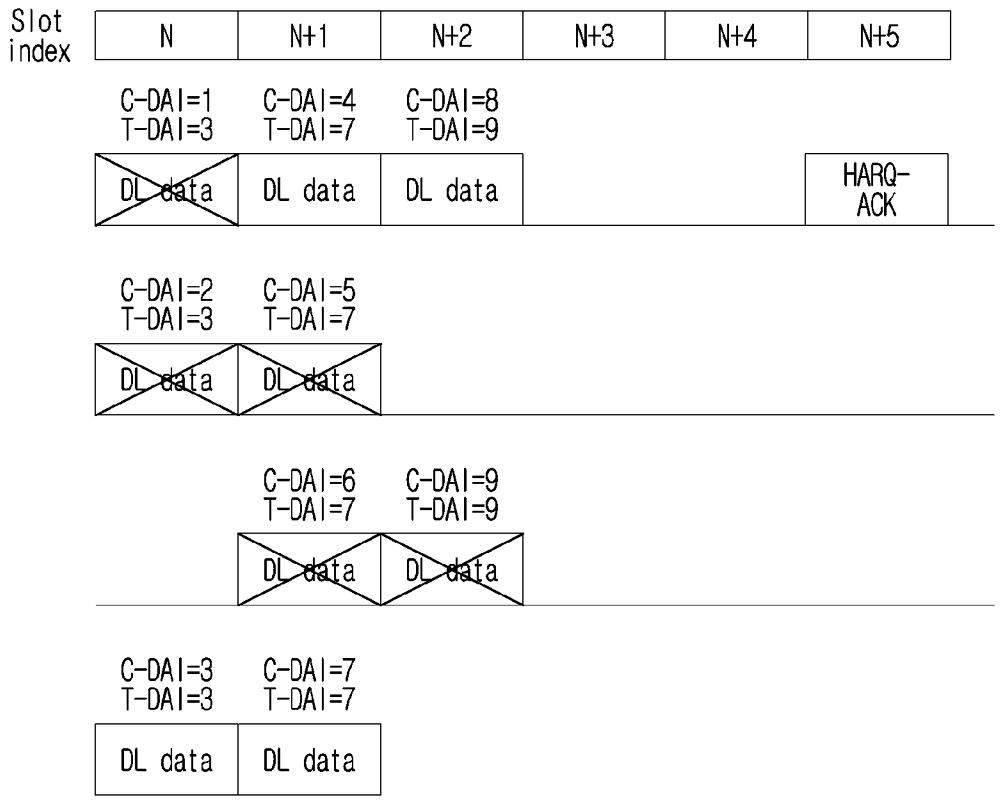
FIG. 13 is an example of downlink assignment indicator (DAI) counting in a wireless communication system according to an embodiment of the present disclosure.

FIG. 13 is an example of downlink assignment indicator (DAI) counting in a wireless communication system according to an embodiment of the present disclosure.

As an example, as shown in FIG. 13, for DL data received from multiple component carriers (CCs) on slots N/N+1/N+2, the UE may perform HARQ-ACK feedback in slot N+5. At this time, if there is one DCI corresponding to a total of 9 DL data, 9 DCI were transmitted on the base station side, but 5 DCI could not be received, and only 4 DCI could be received on the UE side.

In this case, based on $$\left(V_{DAI,m_{last}}^{DL} - \sum_{c=0}^{N_{cells}^{DL}-1} U_{DAI,c}\right)\text{mod}(T_D),$$

since the UE only considers the number of TBs for one DL data when calculating nHARQ-ACK, rather than the number of TBs for the five DL data that were not received, the power applied by the UE when transmitting the corresponding PUCCH may be relatively small. Here, one DL data is according to {1-4} mod (4), and since $V_{DAI,m\_last}{}^{DL}$ value in the formula only has values in the range 1 to 4 when the DAI field is 2-bits, it is replaced with 1 instead of 9. That is, according to the current $n_{HARQ-ACK}$ calculation formula, the PUCCH may be received with power lower than the power expected from the base station reception standpoint, so the PUCCH reception performance may be degraded.

In this embodiment, a method for solving the problem of the PUCCH power value being set low as described above is proposed.

For example, a method of calculating nHARQ-ACK by removing the modulo operation may be considered, as shown in Equation 3 below.

[Equation 3]

$$n_{HARQ-ACK} =$$
$$n_{HARQ-ACK,TB} = \left(U_{total} - \sum_{c=0}^{N_{cells}^{DL}-1} U_{DAI,c}\right) N_{TB,max}^{DL} +$$
$$\sum_{c=0}^{N_{cells}^{DL}-1}\left(\sum_{m=0}^{M-1} N_{m,c}^{received} + N_{SPS,c}\right) +$$
$$\sum_{g=0}^{G-1}\left(\left(U_{total,g} - \sum_{c=0}^{N_{cells,g}^{DL}-1} U_{DAI,c,g}\right) N_{TB,max,g}^{DL} +\right.$$

-continued $$\sum_{c=0}^{N_{cells,g}^{DL}-1}\left(\sum_{m=0}^{M_g-1} N_{m,c,g}^{received} + N_{SPS,c,g}\right)\Bigg)-$$

In Equation 3, $U_{total}$ may refer to the total number of scheduled DCIs (for unicast) determined by the UE, and $U_{total,g}$ may refer to the total number of scheduled DCIs (for multicast) determined by the UE. Here, $U_{total}/U_{total,g}$ may depend on the total number of scheduled DCIs determined based on the T-DAI value and/or C-TAI value last received by the UE.

Specifically, $U_{total}$ or $U_{total,g}$ may be replaced with the value $4*j+V_{temp2}$, which means the HARQ-ACK payload (i.e., $O_{ACK}$) in the pseudo code of the type-2 HCB described above. Here, the HARQ-ACK payload may be a single TB, specifically, a HARQ-ACK payload when 2 TB is not configured or spatial bundling (i.e., bundling in the spatial domain) is configured. At this time, the j value may mean the number of bundles when DAI values are grouped into four groups, as in the pseudo code that induces the HARQ-ACK payload of type-2 HCB. The $V_{temp2}$ value may mean the remaining DAI number less than 4.

When applying the method to the example of FIG. 13, based on $$U_{total} - \sum_{c=0}^{N_{cells}^{DL}-1} U_{DAI,c} (\text{i.e., } 9 - 4 = 5),$$

the UE may consider all TB numbers corresponding to the five DL data that were not received when calculating nHARQ-ACK. In this case, from the base station reception perspective, there is an advantage that it may be received at a power equal to or higher than the expected PUCCH power.

In addition, the proposed method in this embodiment may be extended and applied when determining $n_{HARQ\text{-}ACK,CBG}$ values when Code Block Group (CBG) is configured to construct two sub-CBs. That is, with regard to the CBG-based HARQ-ACK codebook, $n_{HARQ\text{-}ACK,CBG}$ values may be calculated based on Equation 4.

[Equation 4]

$$n_{HARQ-ACK,CBG} = \left(U_{total} - \sum_{c=0}^{N_{cells}^{DL,CBG}-1} U_{DAI,c}^{CBG}\right) N_{HARQ-ACK,max}^{CBG/TB,max} + \sum_{c=0}^{N_{cells}^{DL}-1} \sum_{m=0}^{M-1} N_{m,c}^{received,CBG} -$$

In addition, the proposed method in this embodiment may be extended and applied to determine $n_{HARQ\text{-}ACK,TBG}$ values when multi-PDSCH scheduling DCI and/or bundling in the time domain are configured to construct two sub-CBs. That is, with respect to the Transport Block Group (TBG)-based HARQ-ACK codebook, $n_{HARQ\text{-}ACK,TBG}$ values may be calculated based on Equation 5.

[Equation 5]

$$n_{HARQ-ACK,TBG} = \left(U_{total} - \sum_{c=0}^{N_{cells}^{DL,TBG}-1} U_{DAI,c}^{TBG}\right) N_{HARQ-ACK,max}^{TBG,max} + \sum_{c=0}^{N_{cells}^{DL,TBG}-1} \sum_{m=0}^{M-1} N_{m,c}^{received,TBG} -$$

Figure 14:
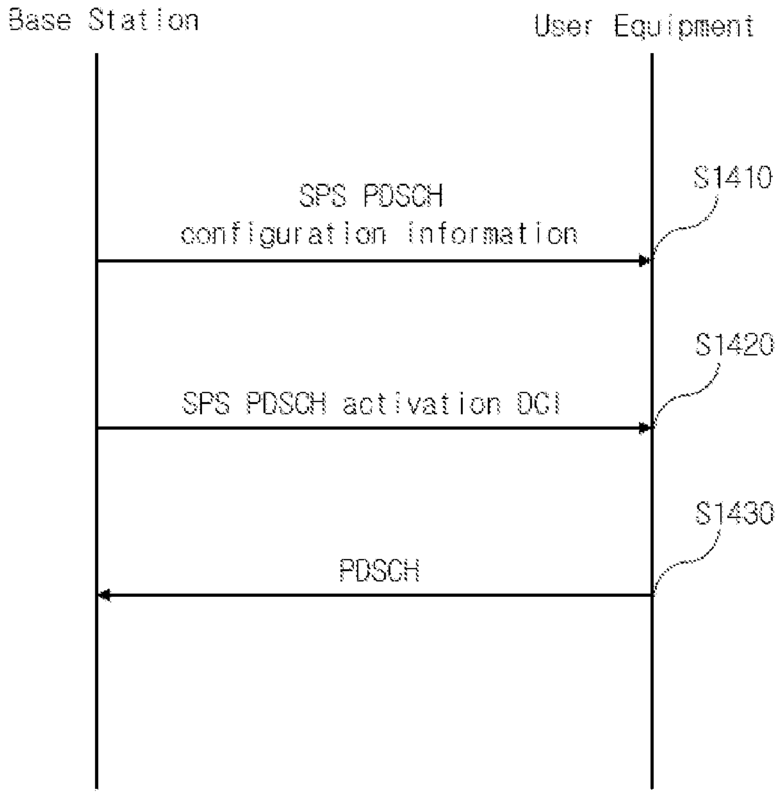
FIG. 14 is a diagram illustrating a signaling procedure between a base station and a UE for a method for transmitting and receiving control information according to an embodiment of the present disclosure.

FIG. 14 is a diagram illustrating a signaling procedure between a base station and a UE for a method of transmitting and receiving control information according to an embodiment of the present disclosure.

Figure 17:
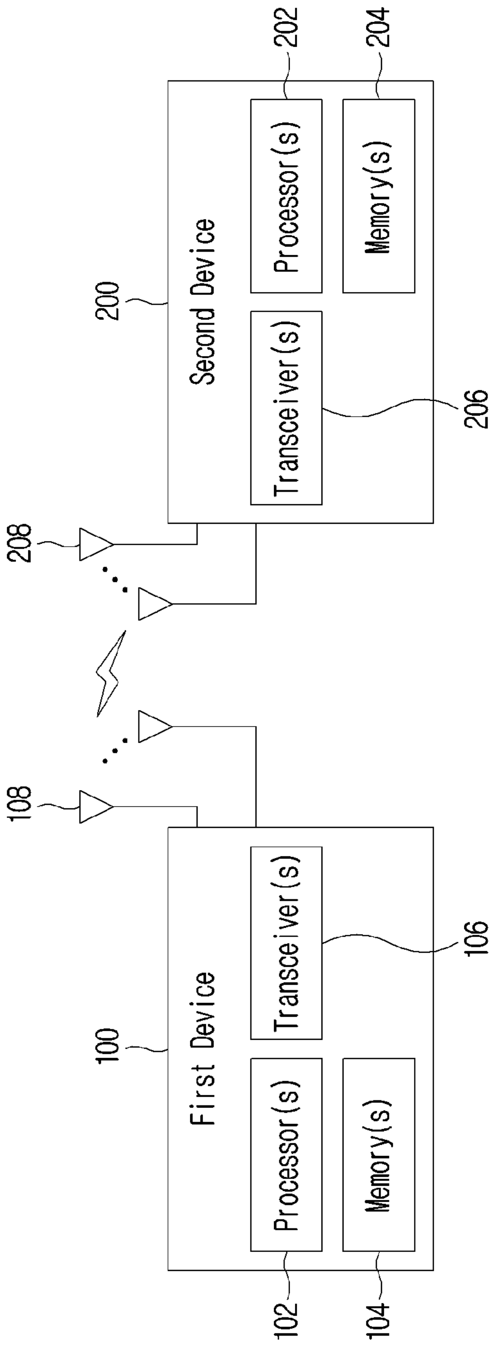
FIG. 17 is a diagram which illustrates a block diagram of a wireless communication device according to an embodiment of the present disclosure.

FIG. 14 illustrates a signaling procedure between a UE and a base station (BS) based on the previously proposed method (e.g., any one of Embodiments 1 to 10 and the detailed embodiments thereof, or a combination of more than one (detailed) embodiments). The example in FIG. 14 is for convenience of explanation and does not limit the scope of the present disclosure. Some step(s) illustrated in FIG. 14 may be omitted depending on the situation and/or setting. Additionally, the base station and the UE in FIG. 14 are only examples, and may be implemented as devices illustrated in FIG. 17 below. For example, the processors 102/202 of FIG. 17 may control transmission and reception of channels/signals/data/information, etc. using the transceivers 106/206, and may control to store transmitted or received channels/signals/data/information, etc. in the memory 104/204.

In addition, in the operation between the base station and the UE in FIG. 14, the above-described content may be referenced/used even if there is no separate mention.

A base station may refer to a general term for objects that transmit and receive data with a UE. For example, the base station may be a concept that includes one or more Transmission Points (TPs), one or more Transmission and Reception Points (TRPs), etc. Additionally, the TP and/or TRP may include a base station panel, a transmission and reception unit, etc. In addition, "TRP" may be applied in place of expressions such as refers to a panel, antenna array, cell (e.g., macro cell/small cell/pico cell, etc.), transmission point (TP), base station (gNB, etc.). As described above, TRPs may be classified according to information (e.g., index, ID) on the CORESET group (or CORESET pool). For example, when one UE is configured to transmit and receive with multiple TRPs (or cells), this may mean that multiple CORESET groups (or CORESET pools) are configured for one UE. Configuration of such a CORESET group (or CORESET pool) may be performed through higher layer signaling (e.g., RRC signaling, etc.).

Referring to FIG. 14, for convenience of explanation, signaling between one base station and a UE is considered, but the signaling method may be expanded and applied to signaling between multiple TRPs and multiple UEs. In the following description, a base station may be interpreted as one TRP. Alternatively, the base station may include multiple TRPs, or may be one cell including multiple TRPs.

In step S1410, the UE may receive configuration information for a semi-persistent scheduling (SPS) PDSCH from the base station. For example, the corresponding configuration information may include scheduling configuration information related to the SPS PDSCH (e.g., SPS PDSCH configuration) and may include one or more SPS PDCSH configurations. The corresponding configuration information may be transmitted through higher layer signaling (e.g., RRC signaling, etc.).

In step S1420, the UE may receive DCI for activation of the SPS PDSCH from the base station. Here, the corresponding SPS PDSCH may mean one or more SPS PDSCH configurations based on the above-described configuration information. After receiving the corresponding DCI, the corresponding SPS PDSCH may be configured/defined to be activated immediately or after a certain period of time.

For example, as in the embodiments described above in this disclosure (particularly, Embodiment 3), the DCI may be a single DCI for scheduling multiple PDSCHs (e.g., the M-DCI described above).

Additionally, the DCI may include a TDRA field for resource allocation in the time domain, and the row index indicated by the corresponding TDRA field may be associated with a single SLIV. That is, when M-DCI-based SPS PDSCH activation is performed, as in the above-described embodiments (particularly, Embodiment 3), it may be configured/defined that the TDRA row index associated with only a single SLIV is indicated.

As an example, as in the embodiments described above in this disclosure (particularly, Example 3), row index candidates related to the TDRA field may be pre-configured/defined as a first row index candidate group and a second row index candidate group. Here, the first row index candidate group may include at least one row index candidate associated with a single SLIV, and the second row index candidate group may include at least one row index candidate associated with multiple SLIVs.

In step S1430, the UE may receive at least one PDSCH from the base station based on the constant DCI. Here, at least one PDSCH may be an SPS PDSCH based on the above-described SPS PDSCH configuration information.

For example, as in the embodiments described above in the present disclosure (particularly Embodiment 3), the resource location within a slot of at least one PDSCH may be determined based on a single SLVI associated with the row index indicated by the DCI.

Additionally, although not shown in FIG. 14, as in the embodiments (particularly, Embodiment 3) described above in the present disclosure, the UE may receive another DCI for deactivation of the SPS PDSCH from the base station.

In this case, the UE may transmit HARQ-ACK information for at least one received PDSCH (e.g., at least one PDSCH in step S1430) to the base station. Similar to the DCI for activation of the SPS PDSCH, the row index indicated by the TDRA field of the other DCI may be associated with a single SLIV.

Here, the HARQ-ACK information may include a HARQ-ACK codebook for at least one PDSCH received by the UE, and the bit position corresponding to at least one PDSCH in the corresponding HARQ-ACK codebook may be determined based on a single SLIV associated with the row index indicated by the TDRA field of the other DCI. Additionally, the transmission timing of the corresponding HARQ-ACK information may be determined based on a single SLIV associated with the row index indicated by the TDRA field of the other DCI.

Figure 15:
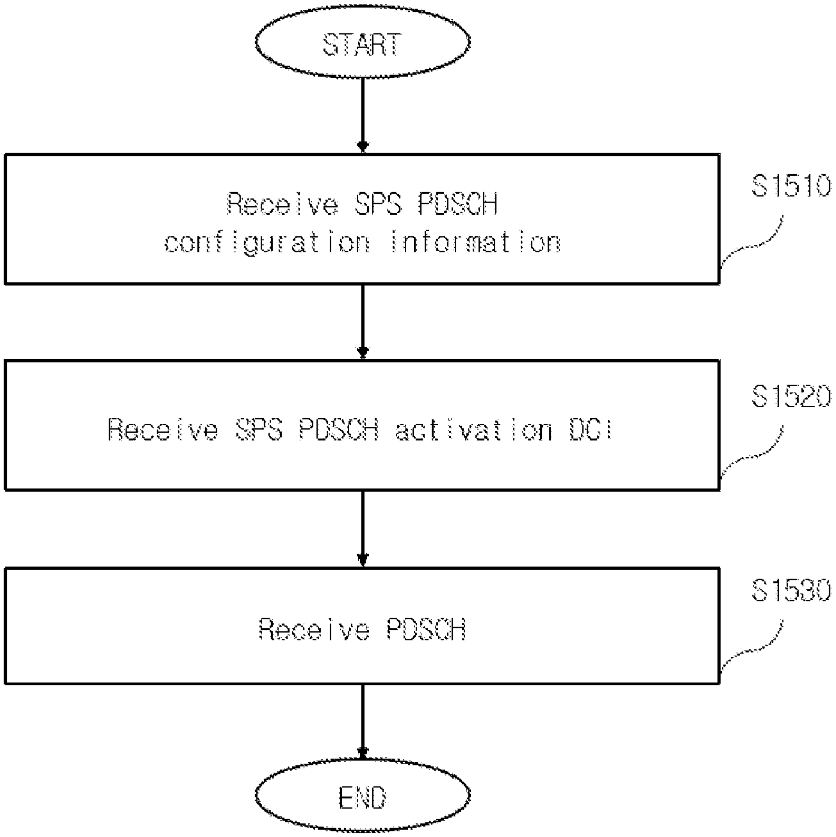
FIG. 15 is a diagram illustrating an operation of a UE for a method for transmitting and receiving control information according to an embodiment of the present disclosure.

FIG. 15 is a diagram illustrating the operation of a UE for a method of transmitting and receiving control information according to an embodiment of the present disclosure.

FIG. 15 illustrates an operation of the UE based on the previously proposed method (e.g., any one of Embodiments 1 to 10 and the detailed embodiments thereof, or a combination of more than one (detailed) embodiments). The example in FIG. 15 is for convenience of explanation and does not limit the scope of the present disclosure. Some step(s) illustrated in FIG. 15 may be omitted depending on the situation and/or setting. Additionally, the UE in FIG. 15 is only examples, and may be implemented as devices illustrated in FIG. 17 below. For example, the processors 102/202 of FIG. 17 may control transmission and reception of channels/signals/data/information, etc. using the transceivers 106/206, and may control to store transmitted or received channels/signals/data/information, etc. in the memory 104/204.

In step S1510, the UE may receive configuration information for the SPS PDSCH. As an example, in relation to the above-described embodiments of the present disclosure, the UE may receive one or more SPS PDCSH configurations related to the SPS PDSCH by the base station. In particular, based on the above-described Embodiment 3, the UE may receive configuration information including scheduling information and/or resource allocation information for the SPS PDSCH.

Since the content of receiving configuration information in step S1510 is the same/similar to the description of step S1410 of FIG. 14, detailed description of overlapping content is omitted.

In step S1520, the UE may receive DCI for activation of the SPS PDSCH. For example, in relation to the above-described embodiments of the present disclosure, the corresponding DCI may be an M-DCI for scheduling multiple PDSCHs. In particular, based on the above-described Example 3, the UE may receive M-DCI for activating the SPS PDSCH.

Since the content of DCI reception in step S1520 is the same/similar to the description of step S1420 of FIG. 14, detailed description of overlapping content is omitted.

In step S1530, the UE may receive at least one PDSCH. As an example, at least one PDSCH may be a PDSCH (particularly, an SPS PDSCH) transmitted based on the configuration information in step S1510 and the DCI in step S1520. In particular, based on the above-described Embodiment 3, the UE may receive one or more PDSCHs transmitted based on SPS PDSCH activation.

Since the content of PDSCH reception in step S1530 is the same/similar to the description of step S1430 of FIG. 14, detailed description of overlapping content is omitted.

In addition, although not shown in FIG. 15, the UE may receive another DCI for deactivating the SPS PDSCH, and may transmit HARQ-ACK information (e.g., HARQ-ACK codebook, etc.) for the PDSCH which is received based on the DCI to the base station. Since the related information is the same/similar to the SPS PDSCH deactivation procedure and the HARQ-ACK information transmission procedure described in FIG. 14, detailed descriptions of overlapping content are omitted.

Figure 16:
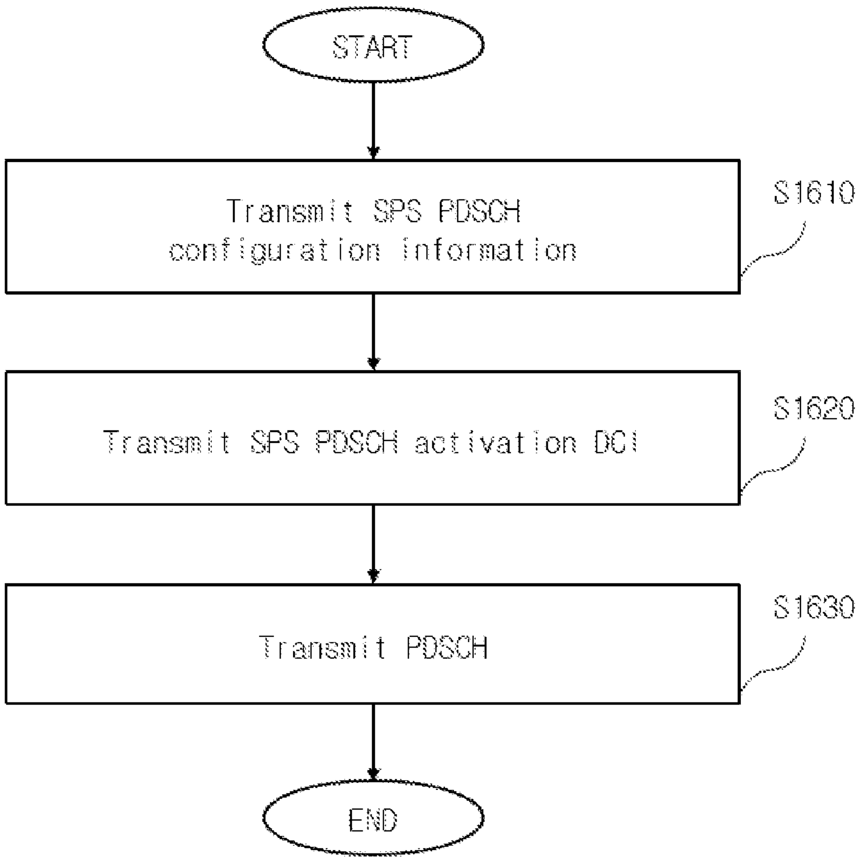
FIG. 16 is a diagram illustrating an operation of a base station for a method for transmitting and receiving control information according to an embodiment of the present disclosure.

FIG. 16 is a diagram illustrating the operation of a base station for a method of transmitting and receiving control information according to an embodiment of the present disclosure.

FIG. 16 illustrates an operation of the base station based on the previously proposed method (e.g., any one of Embodiments 1 to 10 and the detailed embodiments thereof, or a combination of more than one (detailed) embodiments). The example in FIG. 16 is for convenience of explanation and does not limit the scope of the present disclosure. Some step(s) illustrated in FIG. 16 may be omitted depending on the situation and/or setting. Additionally, the base station in FIG. 16 is only examples, and may be implemented as devices illustrated in FIG. 17 below. For example, the processors 102/202 of FIG. 17 may control transmission and reception of channels/signals/data/information, etc. using the transceivers 106/206, and may control to store transmitted or received channels/signals/data/information, etc. in the memory 104/204.

In step S1610, the base station may transmit configuration information for the SPS PDSCH. As an example, in relation to the above-described embodiments of the present disclosure, the base station may provide one or more SPS PDCSH configurations related to the SPS PDSCH to the UE. In particular, based on the above-described Embodiment 3, the base station may transmit configuration information including scheduling information and/or resource allocation information for the SPS PDSCH.

Since the content of transmitting configuration information in step S1610 is the same/similar to the description of step S1410 of FIG. 14, detailed description of overlapping content is omitted.

In step S1620, the base station may transmit DCI for activation of the SPS PDSCH. For example, in relation to the above-described embodiments of the present disclosure, the corresponding DCI may be an M-DCI for scheduling multiple PDSCHs. In particular, based on the above-described Example 3, the base station may transmit M-DCI for activating the SPS PDSCH.

Since the content of DCI transmission in step S1620 is the same/similar to the description of step S1420 of FIG. 14, detailed description of overlapping content is omitted.

In step S1630, the base station may transmit at least one PDSCH. As an example, at least one PDSCH may be a PDSCH (particularly, an SPS PDSCH) transmitted based on the configuration information in step S1610 and the DCI in step S1620. In particular, based on the above-described Embodiment 3, the base station may transmit one or more PDSCHs based on SPS PDSCH activation.

Since the content of PDSCH reception in step S1630 is the same/similar to the description of step S1430 of FIG. 14, detailed description of overlapping content is omitted.

In addition, although not shown in FIG. 16, the base station may transmit another DCI for deactivating the SPS PDSCH, and may receive HARQ-ACK information (e.g., HARQ-ACK codebook, etc.) for the PDSCH which is transmitted based on the DCI from the UE. Since the related information is the same/similar to the SPS PDSCH deactivation procedure and the HARQ-ACK information transmission procedure described in FIG. 14, detailed descriptions of overlapping content are omitted.

General Device to which the Present Disclosure May be Applied

FIG. 15 illustrates a block diagram of a wireless communication device according to an embodiment of the present disclosure.

In reference to FIG. 15, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:

receiving, by a user equipment (UE) from a base station, configuration information for a semi-persistent scheduling (SPS);

receiving, by the UE from the base station, downlink control information (DCI) indicating an activation for the SPS; and receiving, by the UE from the base station, at least one physical downlink shared channel (PDSCH) based on the DCI, wherein validity of the activation for the SPS is determined based on whether a time domain resource assignment (TDRA) field of the DCI indicates a row with a single start and length indicator value (SLIV).

2. The method of claim 1, wherein the DCI corresponds to a single DCI for scheduling a plurality of PDSCHs.

3. The method of claim 1, wherein a first row index group and a second row index group related to the TDRA field are pre-configured, wherein the first row index group includes at least one row index associated with a single SLIV, and wherein the second row index group includes at least one row index associated with a plurality of SLIVs.

4. The method of claim 1, wherein a resource location within a slot of the at least one PDSCH is determined based on the single SLIV.

5. The method of claim 1, further comprising:

receiving other DCI indicating a deactivation for the SPS from the base station; and transmitting HARQ-ACK information for the at least one PDSCH to the base station, wherein a TDRA field of the other DCI indicates a row with a single SLIV.

6. The method of claim 5, wherein the HARQ-ACK information includes a HARQ-ACK codebook for the at least one PDSCH, and wherein a bit position corresponding to the at least one PDSCH in the HARQ-ACK codebook is determined based on the single SLIV for the row indicated by the TDRA field of the other DCI.

7. The method of claim 5, wherein transmission timing of the HARQ-ACK information is determined based on the single SLIV for the row indicated by the TDRA field of the other DCI.

8. An apparatus for a user equipment (UE), the apparatus comprising:

at least one transceiver for transmitting and receiving a wireless signal; and at least one processor for controlling the at least one transceiver, wherein the at least one processor configured to:

receive, from a base station, configuration information for a semi-persistent scheduling (SPS);

receive, from the base station, downlink control information (DCI) indicating an activation the SPS; and receive, from the base station, at least one physical downlink shared channel (PDSCH) based on the DCI, wherein validity of the activation for the SPS is determined based on whether a time domain resource assignment (TDRA) field of the DCI indicates a row with a single start and length indicator value (SLIV).

9. An apparatus for a base station, the apparatus comprising:

at least one transceiver; and at least one processor coupled with the at least one transceiver, wherein the at least one processor is configured to:

transmit, to a user equipment, configuration information for a semi-persistent scheduling (SPS);

transmit, to the UE, downlink control information (DCI) indicating an activation for the SPS; and transmit, to the UE, at least one PDSCH based on the DCI, wherein validity of the activation for the SPS is determined based on whether a time domain resource assignment (TDRA) field of the DCI indicates a row with a single start and length indicator value (SLIV).

* * * * *